(12) United States Patent
Moriyama et al.

(10) Patent No.: US 9,180,901 B2
(45) Date of Patent: Nov. 10, 2015

(54) STEERING WHEEL POSITION ADJUSTING APPARATUS

(71) Applicant: NSK LTD., Tokyo (JP)

(72) Inventors: Seiichi Moriyama, Gunma (JP); Daisuke Terasawa, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/402,862

(22) PCT Filed: Jul. 3, 2013

(86) PCT No.: PCT/JP2013/068297
§ 371 (c)(1),
(2) Date: Nov. 21, 2014

(87) PCT Pub. No.: WO2014/007304
PCT Pub. Date: Jan. 9, 2014

(65) Prior Publication Data
US 2015/0166093 A1    Jun. 18, 2015

(30) Foreign Application Priority Data

Jul. 4, 2012   (JP) ................. 2012-150338
Jul. 4, 2012   (JP) ................. 2012-150339
Oct. 12, 2012  (JP) ................. 2012-227130
Dec. 3, 2012   (JP) ................. 2012-264061
Dec. 3, 2012   (JP) ................. 2012-264069

(51) Int. Cl.
*B62D 1/18* (2006.01)
*B62D 1/184* (2006.01)
*B62D 1/189* (2006.01)

(52) U.S. Cl.
CPC ............... *B62D 1/184* (2013.01); *B62D 1/189* (2013.01)

(58) Field of Classification Search
CPC ............................ B62D 1/184; B62D 1/189
See application file for complete search history.

(56) References Cited

U.S. PATENT DOCUMENTS 8,171,819 B2   5/2012   Shimoyama et al.
8,342,574 B2   1/2013   Bahr et al.
(Continued)

FOREIGN PATENT DOCUMENTS

CN   101306696   11/2008
CN   102076548   5/2011
(Continued)

OTHER PUBLICATIONS

International Search Report and Written Opinion dated Sep. 17, 2013, from the corresponding PCT/JP2013/068297.
(Continued)

*Primary Examiner* — Drew Brown
(74) *Attorney, Agent, or Firm* — Katten Muchin Rosenman LLP

(57) ABSTRACT

When an adjustment lever 32 is rotated in order to adjust the position of a steering wheel 1, the adjustment lever 32 is prevented from vigorously rotating, which prevents making the driver who operates the adjustment lever 32 feel discomfort. An expandable damper 35 that provides resistance to the rotation of the adjustment lever 32 is provided between a protrusion 34 that rotates together with the adjustment lever 32 centered around an adjustment rod and an extending portion 37 that is provided on a support-plate portion 15c. The expandable damper 35 has a cylinder portion 38 and a damper rod 39 that are combined so as to be able to displace relative to each other in the axial direction by way of grease 40.

9 Claims, 33 Drawing Sheets

(56) References Cited

U.S. PATENT DOCUMENTS

| | | | |
|---|---|---|---|
| 8,555,745 B2 | 10/2013 | Inoue | |
| 8,678,437 B2 | 3/2014 | Narita et al. | |
| 8,689,660 B2 | 4/2014 | Okada | |
| 8,707,818 B2 | 4/2014 | Okada et al. | |
| 8,915,164 B2 * | 12/2014 | Moriyama | 74/493 |
| 2002/0023515 A1 | 2/2002 | Kuroumaru et al. | |
| 2003/0164608 A1 * | 9/2003 | Morita et al. | 280/775 |
| 2004/0134302 A1 * | 7/2004 | Ko et al. | 74/493 |
| 2008/0141817 A1 * | 6/2008 | Fuchigami et al. | 74/493 |
| 2009/0020995 A1 * | 1/2009 | Kim | 280/775 |
| 2014/0338491 A1 * | 11/2014 | Moriyama | 74/493 |

FOREIGN PATENT DOCUMENTS

| | | |
|---|---|---|
| CN | 102112362 | 6/2011 |
| CN | 102438879 | 5/2012 |
| CN | 102523738 | 6/2012 |
| CN | 102523739 | 6/2012 |
| DE | 3942106 A1 | 6/1991 |
| JP | 52-73285 A | 6/1977 |
| JP | 4-138928 A | 5/1992 |
| JP | 9-272446 A | 10/1997 |
| JP | 10-259847 A | 9/1998 |
| JP | 2002-59851 A | 2/2002 |
| JP | 2007-76474 A | 3/2007 |
| JP | 2008-195180 A | 8/2008 |
| JP | 2011-121443 A | 6/2011 |

OTHER PUBLICATIONS

International Preliminary Report on Patentability dated Oct. 28, 2014, from the corresponding PCT/JP2013/068297.

Office Action dated Jun. 3, 2015 from the corresponding Chinese Application No. CN201380001450.6.

* cited by examiner (A)

(B)

(A)

(B)

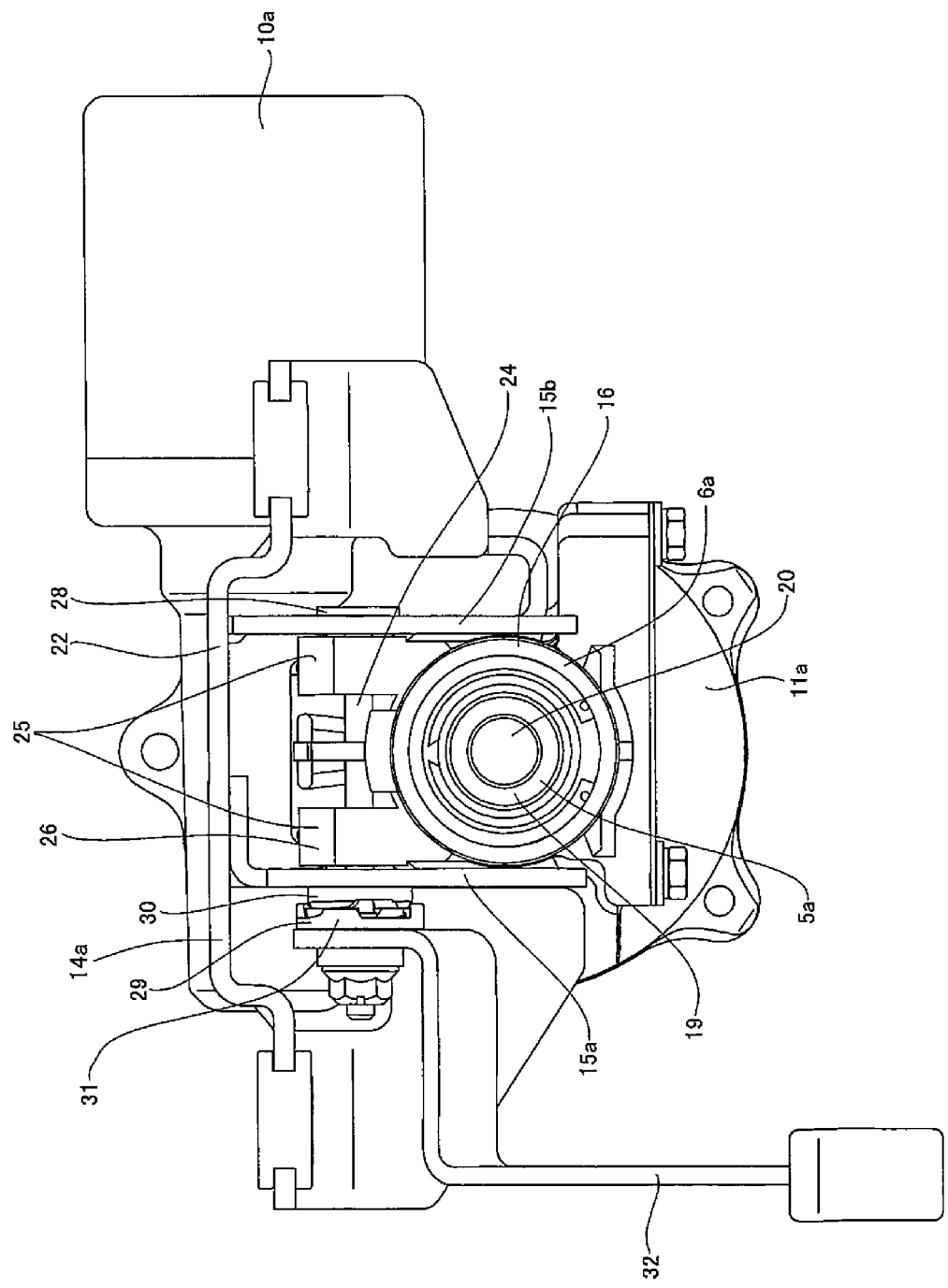

STEERING WHEEL POSITION ADJUSTING APPARATUS

TECHNICAL FIELD

The present invention relates to a steering wheel position adjusting apparatus for adjusting the height position and forward-backward position of a steering wheel according to the size and operating posture of a driver.

BACKGROUND ART

As illustrated in FIG. 41, a steering apparatus for an automobile is constructed so that the rotation of a steering wheel 1 is transmitted to an input shaft 3 of a steering gear unit 2, and as the input shaft 3 rotates a pair of tie rods 4 are pushed or pulled and applies a steering angle to front steered wheels. The steering wheel 1 is supported by and fastened to a rear-end portion of a steering shaft 5, and the steering shaft 5 is inserted in the axial direction through a cylindrical steering column 6, and is supported by the steering column 6 so as to be able to rotate freely. Moreover, the front-end portion of the steering shaft 5 is connected to the rear-end portion of an intermediate shaft 8 by way of a universal joint 7, and the front-end portion of the intermediate shaft 8 is connected to the input shaft 3 by way of another universal joint 9. In the illustrated example, an electric power-steering apparatus is assembled, and at a front-end portion of the steering column 6, an electric motor 10 which is an auxiliary power source that provides auxiliary power is supported by a housing 11 that is fastened to a front-end portion of the steering column 6, and an output torque (auxiliary power) from the electric motor 10 is applied to a steering shaft 5 by way of a gear unit that is provided inside the housing 11.

In this kind of steering apparatus for an automobile, a position adjustment apparatus for adjusting the height position and forward-backward position of the steering wheel according to the size or operating posture of the driver is normally assembled. In the case of the conventional construction illustrated in FIG. 41, the front-end portion of the housing 11 is supported by a vehicle body 12 by way of a tilt shaft 13 that is arranged in the width direction so as to be able to pivotally displace with respect to the vehicle body 12. The portion near the rear end of the middle portion of the steering column 6 is supported by the vehicle body 12 by way of the support bracket 14 while being held in the width direction from both sides by a pair of support-plate portions 15 that constitute a support bracket 14 that are separated in the width direction. A displacement bracket 18 is provided in the portion on the bottom surface of the portion near the rear end of the middle portion of the steering column 6 that is held by the pair of support-plate portions 15. Here, the "width direction" refers to the width direction of the vehicle body in which the steering apparatus is assembled. Further, the forward-backward direction" refers to the forward-backward direction of the vehicle body.

Long holes 23 in the up-down direction that extend in the up-down direction in an arc shape centered around the tilt shaft 13 are formed in each of the pair of support-plate portions 15. Displacement-side through holes (through holes) 27 are formed in portions of part of the displacement bracket 18 that are aligned with the part of the long holes 23 in the up-down direction. In the construction illustrated in FIG. 41, a tilt and telescopic mechanism that is capable of adjusting not only the up-down position of the steering wheel 1, but also the forward-backward position thereof, is assembled, so the displacement-side through holes 27 are long holes in the forward-backward direction that extend in the axial direction of the steering shaft 5 and steering column 6. Furthermore, the steering shaft 5 and steering column 6 are both constructed so as to be able to expand or contract. An adjustment rod 24 is inserted in the width direction through the long holes 23 in the up-down direction and the displacement-side through holes 27. Furthermore, an anchor portion (not illustrated) is provided at a base-end portion of the adjustment rod 24, and by providing an adjustment lever (not illustrated) at a tip-end portion of the adjustment rod 24, a lock mechanism is formed that expands or contracts the space between the inside surfaces of the pair of support-plate portions 15 according to the pivotal rotation of the adjustment lever. When adjusting the position of the steering wheel 1, the space between the inside surfaces of the pair of support-plate portions 15 is expanded by pivotally rotating the adjustment lever in a specified direction. In this state, the up-down position and the forward-backward position of the steering wheel 1 can be adjusted within the range that the adjustment rod is able to move inside the long holes 23 in the up-down direction and the displacement-side holes 27. After the steering wheel 1 has been moved to a desired position, the adjustment lever is pivotally rotated in the opposite direction, which contracts the space between the inside surfaces of the pair of support-plate portions 15, and the steering wheel 1 is maintained in the adjusted position.

More detailed construction of a steering wheel position adjusting apparatus is disclosed in JP 2011-121443 (A) and illustrated in FIG. 42 to FIG. 45. This steering wheel position adjusting apparatus as well has a tilt and telescopic mechanism. The steering column 6a is constructed such that the overall length thereof can be expanded or contracted by fitting the front-end portion of an outer column 16 of the rear side with the rear-end portion of an inner column 17 on the front side so that displacement in the axial direction is possible. Moreover, the front-end portion of the outer column 16 is an incomplete cylindrical shape having a diameter that can be elastically expanded or contracted. By increasing or decreasing the force by which the front-end portion of the outer column 16 is held from both sides in the width direction, it becomes possible for the inner diameter of the outer column 16 to expand or contract. The steering shaft 5a is supported on the radially inward side of the steering column 6a so as to be able to rotate freely. The steering shaft 5a is also constructed such that the overall length can be expanded or contracted by combining an outer shaft 19 and an inner shaft 20.

An electric motor 10a and housing 11a are connected and fastened to the front-end portion of the steering column 6a. The housing 11a is inserted into a support tube 21 that is provided in the width direction at the top portion, and is supported by part of the vehicle body by way of a bolt (not illustrated) that corresponds to the tilt shaft 13 so as to be able to pivotally displace. Moreover, a support bracket 14a is located at the middle portion of the steering column 6a. The support bracket 14a has an installation-plate portion 22 and a pair of support-plate portions 15a, 15b that are made of metal such as steel plate that has sufficient strength and rigidity and are connected together by welding or the like. The installation-plate portion 22 is fastened to and supported by the vehicle body 12 by way of a vehicle-side bracket (not illustrated) so as to be detachable in the forward direction due to an impact load that is applied during a secondary collision.

Moreover, long holes 23 in the up-down direction that have a partial arc shape centered around the center axis of the support tube 21 are formed in positions in the pair of support-plate portions 15a, 15b that are aligned with each other. A supported portion 26 that is constructed by a pair of supported-wall portions 25 that are separated in the width direction is provided on the top of the front portion of the outer column 16, and long holes 27 in the forward-backward direction that extend in the axial direction of the outer column 16 are formed in the pair of supported-wall portions 25. The outer column 16 is supported between the pair of support-plate portions 15a, 15b by an adjustment rod 24 that is inserted through the long holes 23 in the up-down direction and the long holes 27 in the forward-backward direction. Therefore, the outer column 16 is able to pivotally displace in the up-down direction centered around the bolt that is inserted in the support tube 21 within the range that the adjustment rod 24 is able to displace inside the long holes 23 in the up-down direction, and is able to displace in the forward-backward direction (axial direction) within the range that the adjustment rod 24 is able to displace inside the long holes 27 in the forward-backward direction.

An outward-facing flange portion 28 that corresponds to the anchor portion is provided around the base-end portion (right-end portion in FIG. 45) of the adjustment rod 24, and a cam apparatus 31 that has a drive-side cam 29 and a driven-side cam 30 is provided on the tip-end portion (left-end portion in FIG. 45) of the adjustment rod 24. By rotating and driving the drive-side cam 29 using an adjustment lever 32, the distance between the driven-side cam 30 and the flange portion 28 can be expanded or contracted. In other words, as disclosed in JP 2002-059851 (A), cam surfaces are formed on the surfaces of the drive-side cam 29 and driven-side came 30 that face each other, and these cam surfaces each has concave and convex portions that alternate continuously in the circumferential direction by way of inclined surfaces. In a state in which convex portions of each surface abut on each other, the dimension in the axial direction of the cam apparatus 31 is expanded, and in a state in which the convex portions of one surface and the concave portions of the other surface are aligned, the dimension in the axial direction of the cam apparatus 31 is contracted. The drive-side cam 29 is connected and fastened to the base-end portion of the adjustment lever 32, and the driven-side cam 30 engages in a long hole 23 in the up-down direction such that only displacement along the long hole 23 in the up-down direction is possible, or in other words, such that the rotation centered around the adjustment rod 24 is prevented.

When adjusting the position of the steering wheel 1, the adjustment lever 32 is rotated downward to cause the dimension in the axial direction of the cam apparatus 31 to contract, which causes the distance between the driven-cam 30 and the flange portion 28 to increase. As a result, the distance between the inside surfaces of the pair of support-plate portions 15a, 15b increases and the surface pressure at the contact areas between the inside surfaces of the pair of support-plate portions 15a, 15b and the outside surfaces of the pair of supported-wall portions 25 decreases or is lost. In this state, the support force of the supported portions 26 with respect to the support bracket 14a is decreased or lost, so the outer column 16 is able to displace and the position of the steering wheel 1 can be adjusted.

After the position of the steering wheel 1 has been adjusted, the adjustment lever 32 is rotated upward causing the dimension in the axial direction of the cam apparatus 31 to expand, and causing the distance between the driven-side cam 30 and the flange portion 28 to decrease. As a result, the inside surfaces of the pair of support-plate portions 15a, 15b come in strong contact with the outside surfaces of the pair of supported-wall portions 25, and the up-down position of the steering wheel 1 is fixed. At the same time, the diameter of the front-end portion of the outer column 16 where the pair of supported-wall portions 25 are provided contracts, causing the inner circumferential surface of the front-end portion of the outer column to come in strong contact with the outer circumferential surface of the rear-end portion of the inner column 17 such that the steering column 6a cannot be expanded or contracted. As a result, the forward-backward position of the steering wheel 1 is fixed.

When compared with construction that employs a screw mechanism having a nut and bolt (stud) as a tightening mechanism, a position adjustment apparatus for a steering wheel in which a cam apparatus 31 is assembled as a tightening mechanism is able to obtain a large tightening force while keeping the amount of rotation of the adjustment lever 32 small. However, in using the cam apparatus 31, when the adjustment lever 32 is rotated in a specified direction (normally downward) in order to adjust the position of the steering wheel 1, there is a possibility that the rotation of the adjustment lever 32 will be too strong. The reason for this is that when moving from a state in which the convex portions on the cam surfaces of the drive-side cam 29 and driven-side cam 30 abut on each other to a state in which the convex portions are moved toward the concave portions on the opposing surface by rotating the adjustment lever in a specified direction, the convex portions vigorously slide down the inclined surfaces of the cam surface on the opposing side. As a result, the adjustment lever 32 to which the drive-side cam 29 fastened at the base-end portion vigorously rotates in a specified direction, which may cause the driver who operates the adjustment lever to feel discomfort or unpleasant, or may cause an unpleasant collision sound to occur.

This kind of problem becomes severe when the cam apparatus is assembled in the steering wheel position adjusting apparatus as the tightening mechanism, however, even in construction that employs a screw mechanism as the tightening mechanism, there is a possibility that this problem will occur to some extent. In other words, even in the case of a tightening mechanism that uses a screw mechanism, there is a tendency for the tightening mechanism to rotate in the loosening direction due to engagement between a female screw and male screw when rotating the adjustment lever to a position for allowing adjustment of the position of the steering wheel. As a result, the force required for rotating the adjustment lever becomes excessively light, and there is a possibility that the driver who operates the adjustment lever will feel discomfort.

RELATED LITERATURE

Patent Literature

[Patent Literature 1] JP 2011-121443 (A)
[Patent Literature 2] JP 2002-059851 (A)

SUMMARY OF INVENTION

Problem to be Solved by Invention

The object of the present invention is to provide a steering wheel position adjusting apparatus having construction that prevents the adjustment lever from vigorously rotating when the adjustment lever is rotated in order to adjust the position of the steering wheel.

Means for Solving Problems

The steering wheel position adjusting apparatus of the present invention has:

a steering column;

a supported portion provided on part of the steering column;

a displacement-side though hole provided in the supported portion;

a steering shaft supporting a steering wheel on the rear-end portion of the steering shaft, the steering shaft being rotatably supported on the radially inward side of the steering column;

a support bracket having a pair of support-plate portions that hold the supported portion from both sides in the width direction, the support bracket being supported by a portion that is fastened to a vehicle body;

a pair of fixed-side through holes provided in portions of the pair of support-plate portions that are aligned with each other;

an adjustment rod inserted in the width direction through the pair of fixed-side though holes and the displacement-side through hole;

an anchor portion provided on one end portion of the adjustment rod that protrudes out from the outside surface of one support-plate portion of the pair of support-plate portions;

a pressing portion provided on the other end portion of the adjustment rod that protrudes out from the outside surface of the other support-plate portion of the pair of support-plate portions;

an expansion mechanism expanding or contracting the space between the pressing portion and the anchor portion;

an adjustment lever operating the expansion mechanism according to rotation of the adjustment lever centered around the adjustment rod; and a damper provided between a portion that rotates together with the adjustment lever centered around the adjustment rod and a portion that is fixed to the other support-plate portion, and providing resistance against at least the rotation of the adjustment lever in a direction toward a position that enables position adjustment of the steering wheel, and at least one of the pair of fixed-side through holes and the displacement-side through hole is constructed by a long hole that extends in the adjustment direction of the steering wheel.

It is preferable that, the damper is constructed by an expandable damper that provides resistance with respect to a direction of expansion or contraction of the overall length. It is preferable that the expandable damper has:

a cylinder portion having a cylindrical shape that has a tip-end portion, a base-end portion and an opening that is open on the tip-end portion of the cylinder portion; and a damper rod that has a tip-end portion, a middle portion and a base-end portion, the base-end portion to the middle portion of the damper being loosely inserted inside the cylinder portion from the opening on the tip-end portion of the cylinder portion;

the base-end portion of the cylinder portion is supported by one of the portion that rotates together with the adjustment lever centered around the adjustment rod, and the portion that is fixed to the other support-plate portion; and the tip-end portion of the damper rod is supported by the other of the portion that rotates together with the adjustment lever centered around the adjustment rod, and the portion that is fixed to the other support-plate portion;

with the base-end portion of the cylinder portion an the tip-end portion of the damper rod being supported to be pivotally displaced respectively centered around a pivot shaft that is arranged in the width direction, and to absorb dimensional change in the axial dimension of the expansion mechanism.

Alternatively, the damper can be constructed by an expandable damper that is formed by combining a first sliding member and a second sliding member that are able to slide in the axial direction, and that provides resistance with respect to a direction of expansion and contraction of the overall length. In this case, it is preferable that the first sliding member has:

an radially outward cylinder portion having a cylindrical shape with a bottom;

an radially inward sliding portion that is arranged concentric with the radially outward cylinder portion at the center portion of the radially outward cylinder portion, a base-end portion of the radially inward sliding portion being connected and fastened to the base-end portion of the radially outward cylinder portion; and a first installation portion that is connected and fastened to the base-end portion of the radially outward cylinder portion and the radially inward sliding portion, and the second sliding member has:

an radially inward cylinder portion having a cylindrical shape with a bottom, that is inserted inside a cylindrical space that exists between the inner circumferential surface of the radially outward cylinder portion and the outer circumferential surface of the radially inward sliding portion; and a second installation portion that is connected and fastened to the base-end portion of the radially inward cylinder portion, and the first installation portion is supported by one of the portion that rotates together with the adjustment lever centered around the adjustment rod, and the portion that is fixed to the other support-plate portion, and the second installation portion is supported by the other of the portion that rotates together with the adjustment lever centered around the adjustment rod, and the portion that is fixed to the other support-plate portion, with the first installation portion and the second installation portion being supported to be pivotally displaced respectively centered around a pivot shaft that is arranged in the width direction, and to absorb dimensional change in the axial dimension of the expansion mechanism.

In this case, it is preferable that the radially inward sliding portion has a round rod shape, and the circumferential surfaces of the first sliding member and the second sliding member face each other at two concentric locations in the radial direction: a portion where the outer circumferential surface of the radially inward sliding portion faces the inner circumferential surface of the radially inward cylinder portion, and a portion where the outer circumferential surface of the radially inward cylinder portion faces the inner circumferential surface of the radially outward cylinder portion.

Alternatively, the radially inward sliding portion has a cylindrical shape, and a center sliding portion having a round rod shape that is provided in the center portion of the radially inward cylinder portion is inserted into a center hole in the radially inward sliding portion, and the circumferential surfaces of the first sliding member and the second sliding member face each other at three concentric locations in the radial direction: a portion where the outer circumferential surface of the center sliding portion faces the inner circumferential surface of the radially inward sliding portion, a portion where the outer circumferential surface of the radially inward sliding portion faces the inner circumferential surface of the radially inward cylinder portion, and a portion where the outer circumferential surface of the radially inward cylinder portion faces the inner circumferential surface of the radially outward cylinder portion.

Furthermore, alternatively, the damper may be an expandable damper that is formed by combining a first sliding member and a second sliding member that are able to slide in the axial direction, and provide resistance with respect to a direction of expansion and contraction of the overall length. In this case, the first sliding member has:
a cylinder portion having a cylindrical shape with a bottom; and
a first installation portion that is connected and fastened to the base-end portion of the cylinder portion, and
the second sliding member has:
a piston portion that is inserted into the cylinder portion; and
a second installation portion that is connected and fastened to the base-end portion of the piston portion, and
a concave portion that is more recessed than the adjacent portions is provided on at least one circumferential surface of the outer circumferential surface of the piston portion and the inner circumferential surface of the cylinder portion, and
the piston portion and the cylinder portion are constructed so that the distance between the outer circumferential surface of the piston portion and the inner-circumferential surface of the cylinder portion in the portion where the concave portion is provided is greater than the distance between these circumferential surfaces in the portions where the concave portion is not provided, and the surface area of the portion between the circumferential surfaces where the distance between these circumferential surfaces is large changes as the piston portion and cylinder portion displace in the axial direction, and
the first installation portion is supported by one of the portion that rotates together with the adjustment lever centered around the adjustment rod, and the portion that is fixed to the other support-plate portion, and
the second installation portion is supported by the other of the portion that rotates together with the adjustment lever centered around the adjustment rod, and the portion that is fixed to the other support-plate portion;
with the first installation portion and the second installation portion being supported to be pivotally displaced respectively centered around a pivot shaft that is arranged in the width direction, and able to absorb dimensional change in the axial dimension of the expansion mechanism.

In this case, it is preferable that the inner circumferential surface of the cylinder portion has a stepped shape and that is provided with a small-diameter portion in the middle portion in the axial direction, and large-diameter portions on both end portions in the axial direction, where the piston portion has an outer diameter that can be inserted inside the small-diameter portion of the cylinder portion. Furthermore, it is preferable that the length in the axial direction of the piston portion is shorter than the length in the axial direction of the small-diameter portion.

Moreover, it is preferable that a concave portion having a width dimension in the circumferential direction that becomes narrower toward the tip-end side of the piston portion is provided in an opened state in the base-end surface of the piston portion, and such that the tip end of the concave portion does not reach the tip-end surface of the piston portion.

In the steering wheel position adjusting apparatus of the present invention, it is preferable that:

in a state in which the adjustment lever is rotated to the position that enables position adjustment of the steering wheel, and the steering wheel is at the top-end position of the adjustable range, the position where the center position of the connecting portion between the portion that rotates together with the adjustment lever centered around the adjustment rod and one end portion of the expandable damper is taken to be the center position of the top-end side, and in a state in which the steering wheel is at the bottom-end position of the adjustable range, the position where the center position of the connecting portion is taken to be the center position of the bottom-end side, the position of the connecting portion between the other end portion of the expandable damper and the portion fixed to the other support-plate portion is located on a perpendicular bisector of a line that connects the center position of the top-end side and the center position of the bottom-end side, or, is located on a straight line that passes through the center point of the line and is inclined with respect to the perpendicular bisector of the line by an angle having an absolute value of 10 degrees or less.

Moreover, it is preferable that the facing surface area between the inner circumferential surface of the cylinder portion and the outer circumferential surface of the damper rod is maintained by forming these circumferential surfaces so as to be continuous uneven surfaces having alternating concave portions and convex portions.

It is preferable that the expansion mechanism is constructed by a cam apparatus that is provided on a portion of the other end portion of the adjustment rod that protrudes from the outside surface of the other support-plate portion, and that expands or contract the dimension in the axial direction of the cam apparatus based on engagement between a drive-side camp surface and a driven-side cam surface, which are surfaces having convex portions and concave portions that are continuous by way of inclined surfaces, such that the dimension in the axial direction of the cam apparatus is expanded or contracted by the adjustment lever rotating the drive-side cam on which the drive-side cam surface is provided.

It is preferable that grease is located between the inner circumferential surface of the cylinder portion and the damper rod, and it is preferable that the dynamic viscosity of the base oil of the grease is regulated to be in a range of 500 to 50,000 $mm^2$/s at 40° C., and it is more preferable that the dynamic viscosity is regulated to a range of 5,000 to 20,000 $mm^2$/s at 40° C.

It is preferable that the coefficient of linear expansion of the radially inward material of the damper rod is greater than the coefficient of linear expansion of the radially outward material of the cylinder portion. In this case, the radially outward material is an iron-based alloy, and the radially inward material is a light metal alloy or a synthetic resin. It is possible to use stainless steel or the like as the iron-based alloy, and to use an aluminum alloy, magnesium alloy or the like as the light metal alloy. Moreover, various synthetic resins can be used as long as the synthetic resin provides oil resistant, and as long as the necessary strength and rigidity can be maintained. Alternatively, it is also possible for the radially outward material to be a metal, and for the radially inward material to be a synthetic resin. Various materials can be used as the metal and synthetic resin as long as the size relationship of the coefficients of the linear expansion is satisfied, and as long as the necessary oil resistance, strength and rigidity are maintained.

In the steering wheel position adjusting apparatus of the present invention, in case that the expandable damper is used, it is preferable that the base-end portion of the cylinder portion is blocked off except for an airflow path through which air is taken into or discharged from the internal space of the cylinder portion, and it is preferable that a grease reservoir for accumulating grease that is pushed out from between the inner circumferential surface of the cylinder portion and the outer circumferential surface of the damper rod is provided in a portion at the back portion of the cylinder portion where the tip-end opening side is blocked by the damper rod.

In this case, it is preferable that the airflow path is provided at a position where the grease that is inside the grease reservoir will not leak out by way of the airflow path due to the gravity regardless of the adjusted position of the steering wheel and the rotated position of the adjustment lever.

Moreover, the steering wheel position adjusting apparatus of the present invention can be suitably applied to construction in which the front portion of the steering column is supported so as to be able to pivotally displace centered around a tilt shaft that is provided in the width direction. In this case, the pair of fixed-side through holes are constructed by long holes in the up-down direction that extend in the up-down direction, and it is possible to adjust the up-down position of the steering wheel by causing the adjustment rod to displace along the long holes in the up-down direction.

The steering wheel position adjusting apparatus of the present invention can also be suitably applied to a steering apparatus that has not only a tilt mechanism, but also has a telescopic mechanism in which the steering column has an outer column and an inner column that are combined so as to be able to expand and contract, and the steering shaft that has an outer shaft and an inner shaft that are combined so as to be able to transmit torque and be able to expand and contract. In this case, the supported portion is constructed by a column member of the outer column or the inner column that is provided on the rear side, and the displacement-side through hole is constructed by a long hole in the forward-backward direction that extends in the axial direction of the column member. The forward-backward position of the steering wheel can be adjusted within the range that the adjustment rod can be displaced inside the long hole in the forward-backward direction.

Moreover, in the steering wheel position adjusting apparatus of the present invention, in case that the expandable damper is used, it is preferable that a rod-shaped connecting portion which constitutes at least one of two connecting portions located between both end portions of the expandable damper and the portion that rotates together with the adjustment lever centered around the adjustment rod, and the portion that is fixed to the other support-plate portion and does not rotate regardless of the rotation of the adjustment lever has a plurality of elastic leg pieces that are divided in the circumferential direction and that have locking portions that are provided on the tip-end portions of each of the elastic leg pieces and that protrude out in the radial direction of the rod-shaped connecting portion, in which the outer diameter of the portion formed by the elastic leg pieces can elastically expand or contract, and with the rod-shaped connecting portion pushed into a connecting hole of the portion from the tip-end side of the elastic leg pieces, the locking portion of the tip ends of the elastic leg pieces lock with the circumferential edge portion of the opening of the connecting hole so that the rod-shaped connecting portion does not come out from the connecting hole.

Furthermore, in the steering wheel position adjusting apparatus of the present invention, in case that the expandable damper is used, it is preferable that the damper rod of the expandable damper has: a middle large-diameter portion that is formed in a portion near the base end of the middle portion of the damper rod, a base-end side large-diameter portion that is formed in a portion on the base-end portion of the damper rod that is separated in the axial direction from the middle large-diameter portion, and a large-diameter portion near the center that is formed in a portion of the middle portion of the damper rod that is inserted inside the cylinder portion; in which the resistance against the flow of grease in a space that exists between the middle large-diameter portion and the inner circumferential surface of the cylinder portion is greater than the resistance against the flow of grease in a space that exists between the outer circumferential surface of the base-end side large-diameter portion and the outer circumferential surface of the large-diameter portion near the center and the inner circumferential surface of the cylinder portion.

Effect of Invention

With the steering wheel position adjusting apparatus of the present invention, when the adjustment lever is rotated in order to adjust the position of the steering wheel, the adjustment lever is prevented from vigorously rotating. In other words, the damper that is provided between a portion that rotates together with the adjustment lever and a portion that is fixed to the support-plate portion provides resistance against the adjustment lever rotating in a direction toward a position that enables position adjustment of the steering wheel. Therefore, even when the tip-end portions of convex portions on a drive-side cam surface of a drive-side cam and a driven-side cam surface of a driven-side cam of a cam apparatus of an expansion mechanism are strongly pressed against the opposing cam surface, and there is a tendency for the dimension in the axial direction of the expansion mechanism to vigorously contract, the rotational force of the adjustment lever is reduced. As a result, giving an unpleasant feeling to a driver who operates the adjustment lever that rotates the drive-side cam on which the drive-side cam surface is provided is prevented.

BRIEF DESCRIPTION OF DRAWINGS

FIG. 9A(a) and FIG. 9B(a) illustrate a case in which the adjustment lever is rotated to the downward position; and FIG. 9A(b) and FIG. 9B(b) illustrated a case in which the adjustment lever is rotated to the upward position.

FIG. 45 is a view of the example illustrated in FIG. 42 as seen from the rear side.

MODES FOR CARRYING OUT INVENTION

First Example

Figure 1:
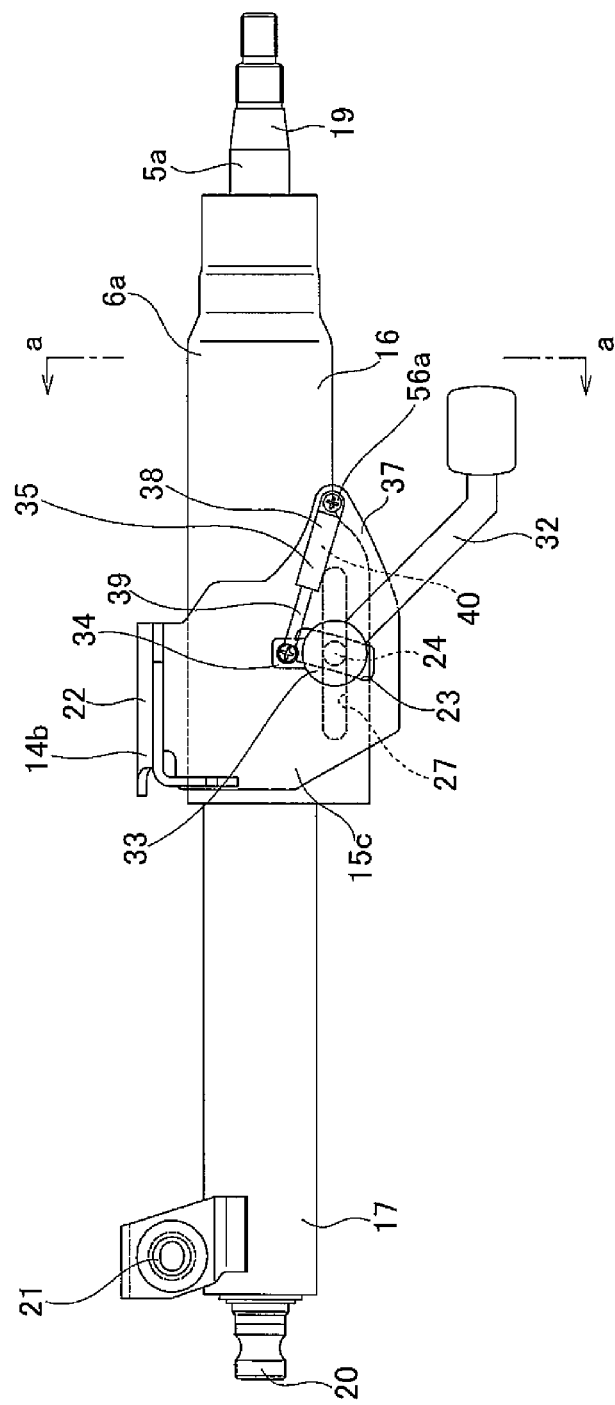
FIG. 1 is a side view of a first example of an embodiment of the present invention.
Figure 2:
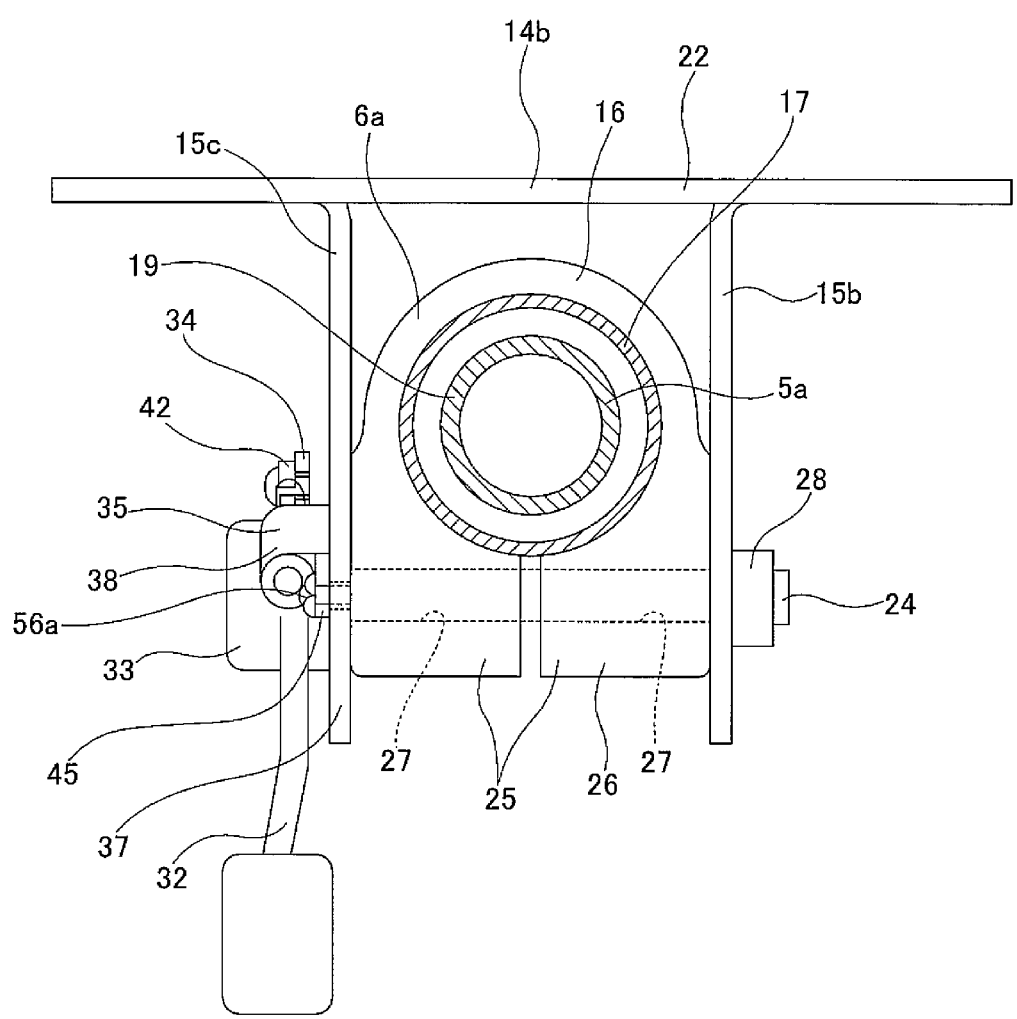
FIG. 2 is an enlarged cross-sectional view of section a-a in FIG. 1.

FIG. 1 to FIG. 11 illustrate a first example of an embodiment of the present invention. The steering wheel position adjusting apparatus of the present invention has: a steering column 6a having a cylindrical shape; a supported portion 26 that is provided on part of the steering column 6a; through hole 27 (long hole in the forward-backward direction), which is a displacement-side through hole that is provided in the supported portion 26; a steering shaft 5a that is supported on the radially inside of the steering column 6a so as to be able to rotate freely, the steering wheel 1 being fastened to the portion on the rear-end portion of the steering shaft 5a that protrudes toward the rear from the opening on the rear end of the steering column 6a; a support bracket 14b that has a pair of support-plate portions 15b, 15c that hold the supported portion 26 from both sides in the width direction, and that is supported by a portion that is fastened to the vehicle body; a pair of long holes 23 in the up-down direction, which are a pair of fixed-side through holes that are provided in portions of the pair of support-plate portions 15, 15c that are aligned with each other; an adjustment rod 24 that is inserted in the width direction through the pair of long holes 23 in the up-down direction, and the long hole 27 in the forward-backward direction; a flange portion 28, which is an anchor portion that is provided on a portion of one end portion (base-end portion) of the adjustment rod 24 that protrudes out from the outside surface of one of the support-plate portions 15b of the pair of support-plate portions 15b, 15c, and that is engaged in a state such that rotation with respect to the one support-plate portion 15b is prevented; a driven-side cam 30 of a cam apparatus 31 (see FIG. 45) as a pressing portion that is provided in a portion on the other end portion (tip-end portion) of the adjustment rod 24 that protrudes from the outside surface of the other support-plate portion 15c of the pair of support-plate portions 15b, 15c; a cam apparatus 31 that is an expansion mechanism that expands or contracts the space between the driven-side cam 30 and the flange portion 28, and that has a drive-side cam 29 and the driven-side cam 30; and an adjustment lever 32 for rotating the drive-side cam 29 and causing the dimension in the axial direction of the cam apparatus 31 to expand or contract. In the case of there is no telescopic function, instead of the long hole in the forward-backward direction, a circular hole is provided as the displacement-side through hole.

More specifically, the cam apparatus 31 is constructed such that the dimension in the axial direction of the cam apparatus 31 can expand or contract according to engagement between the drive-side cam surface of the drive-side cam 29 and the driven-side cam surface of the driven-side cam 30 that are surfaces having convex portions and concave portions that are continuous by way of inclined surfaces and provided on the portion of the tip-end portion of the adjustment rod 24 that protrudes from the outside surface of the other support-plate portion 15c. A feature of the present invention, including this example, is that construction of a steering wheel position adjusting apparatus in which an expansion mechanism that is constructed by the cam apparatus 31 is achieved, the construction being capable of preventing an unpleasant feeling from being given to the driver who operates the adjustment lever by preventing the adjustment lever 32 from vigorously rotating when rotating the adjustment lever 32 in order to adjust the position of the steering wheel 1. The construction and functions of other parts are the same as that of a steering apparatus and steering wheel position adjusting apparatus having conventional construction. The following explanation will center on the features of this example.

Figure 8:
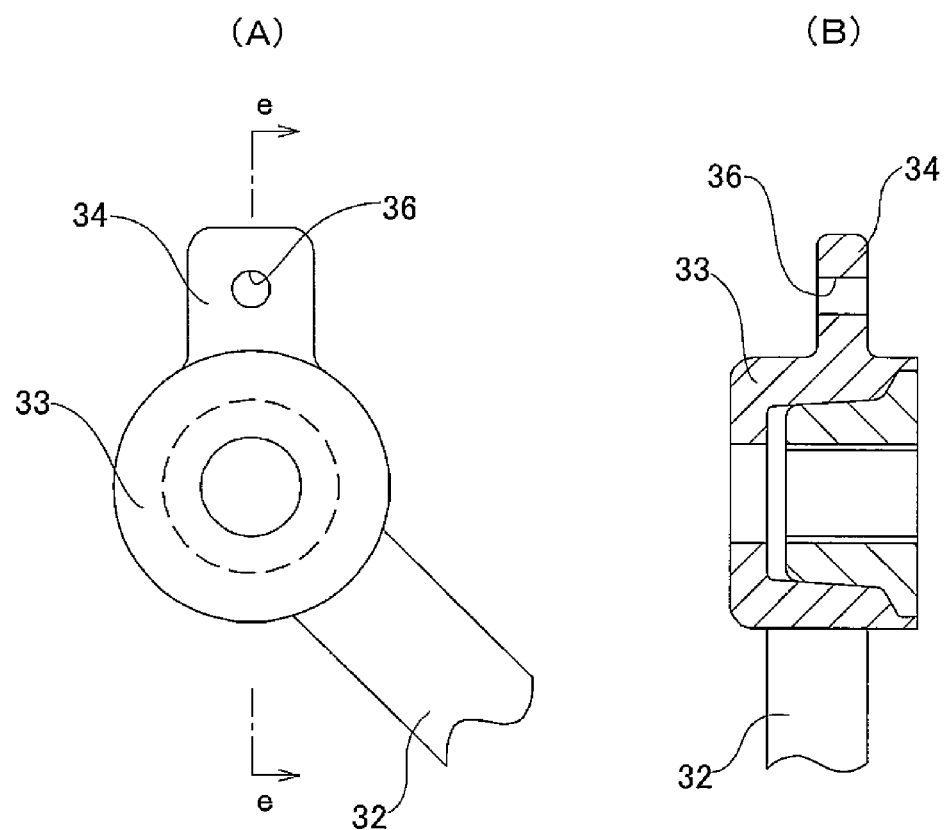
FIG. 8A is a side view that corresponds to the center portion of FIG. 1 illustrating the base-end portion of the adjustment lever that has been removed from the apparatus illustrated in FIG. 1.
FIG. 8B is a cross-sectional view of section e-e in FIG. 8A.
Figure 9:
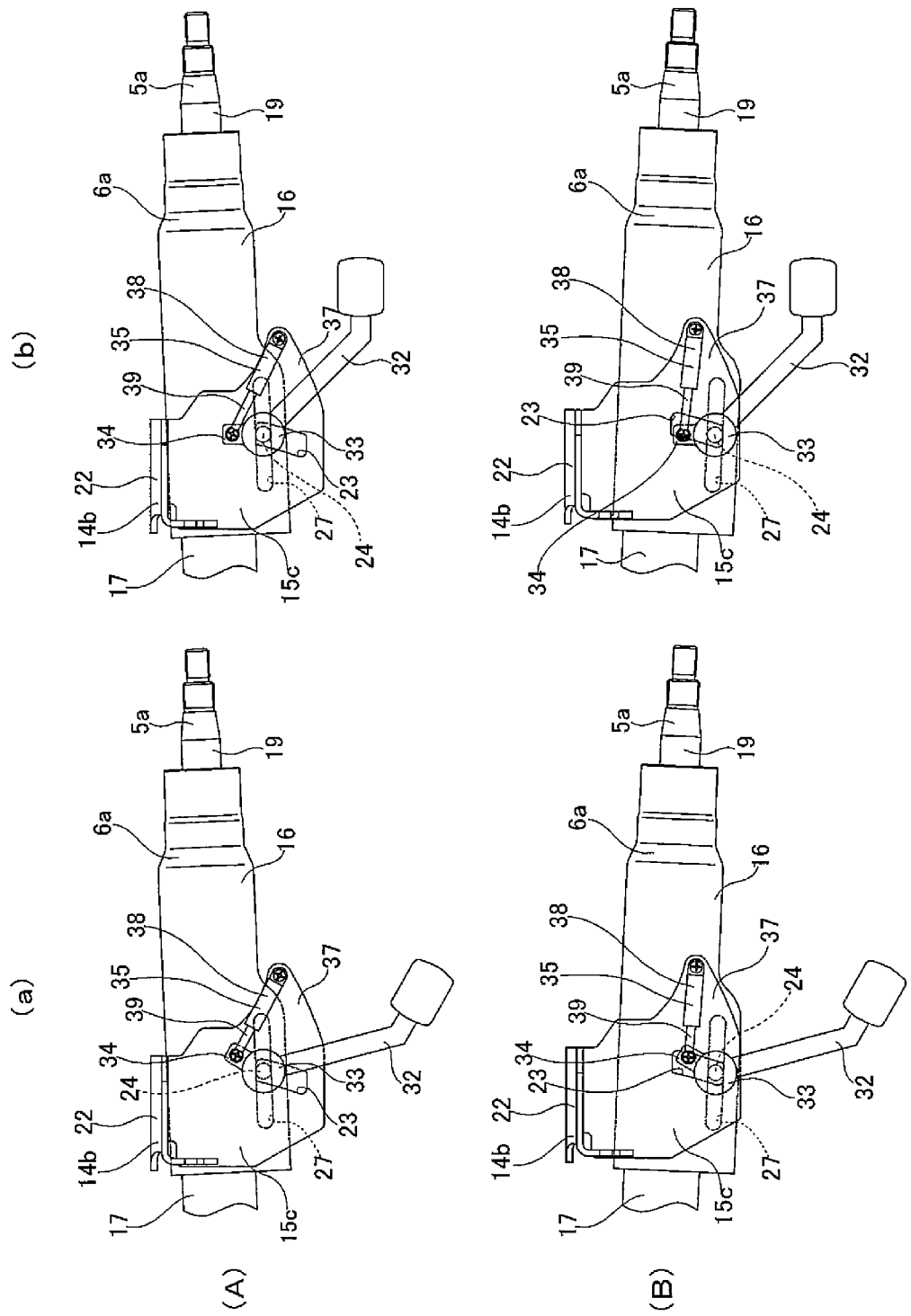
FIGS. 9A(a), (b) and FIGS. 9B(a), (b) are side views illustrating four examples of the change in position of the expandable damper during adjustment of the up-down position of the steering wheel in the apparatus illustrated in FIG. 1; where FIGS. 9A(a), (b) illustrate a case in which the steering wheel is at the top-end position.
FIGS. 9B(a), (b) illustrate a case in which the steering wheel is at the bottom-end position.

In the steering wheel position adjusting apparatus of this example, a boss portions 33 is provided at the base-end portion of the adjustment lever 32, and a protrusion 34 is formed on a portion of the outer peripheral surface of the boss portion 33 that is separated in the circumferential direction from the adjustment lever 32 in a state so as to protrude outward in the radial direction of the outer circumferential surface of the boss portion 33. Therefore, the protrusion 34 rotates together with the adjustment lever 32 centered around the adjustment rod 24. An expandable damper 35 spans between the tip-end portion of the protrusion 34 and the outside surface of the support-plate portion 15c of the support bracket 14b. In order for this, as illustrated in FIG. 8, a circular connecting hole 36 for connecting to one end portion of the expandable damper 35 is formed in the tip-end portion of the protrusion 34. Moreover, the bottom-half portion of the support-plate portion 15c extends toward the rear as an extending portion 37, and a circular connecting hole (not illustrated) is formed in the rear-end portion of the extending portion 37 in order to connect to the other end portion of the expandable damper 35.

The expandable damper 35 has a cylinder portion 38, a damper rod 39 and grease 40. The entire expandable damper 35 is constructed so as to be able to expand and contract, and so as to provide resistance to the force in the direction of expansion or contraction. The cylinder portion 38 is formed using a metal such as aluminum or an oil-resistant resin into a cylindrical shape with the tip-end portion being open. Moreover, the damper rod 39 is formed into a circular column shape using the same material as the cylinder portion 38, and the base-end portion to the middle portion of the damper rod 39 is loosely inserted inside the cylinder portion 38 from an opening on the tip end of the cylinder portion 38. Furthermore, the grease 40 is located in between the inner circumferential surface of the cylinder portion 38 and the outer circumferential surface of the damper rod 39. In other words, the space 41 between the inner circumferential surface of the cylinder portion 38 and the outer circumferential surface of the damper rod 39 is almost filled with grease 40. The dynamic viscosity of the base oil of the grease 40 used is within the range 500 mm$^2$/s to 50,000 mm$^2$/s at 40° C., and preferably within the range 5,000 mm$^2$/s to 20,000 mm$^2$/s at 40° C.

As the damper for weakening the energy by which that the adjustment lever 32 is rotated, in addition to the expandable damper 35 having the construction of this example, it is also possible to use an expandable damper in which an orifice is assembled, or furthermore, it is possible to use a multi-disc type rotary damper. However, the expandable damper 35 having the construction of this example can be manufactured at low cost, and even though compact, the damper is capable of stably displaying a sufficient dampening effect, so even when the installation space for the damper is limited, it is possible to effectively prevent giving a sense of discomfort to the driver caused by the adjustment lever 32 rotating with much energy.

In this example, the shape of the inner circumferential surface of the cylinder portion 38 and the outer circumferential surface of the damper rod 39 is a simple cylindrical surface such as illustrated in FIG. 5A, however it is also possible to use a spline-shaped uneven shape such as illustrated in FIG. 5B. The expandable damper 35 is such that when the cylinder portion 38 and damper rod 39 displace relative to each other in the axial direction, a shearing force acts on the grease 40 located inside the space 41, which results in resistance against the relative displacement (expansion or contraction of the expandable damper 35). This resistance force becomes larger the higher the viscosity of the grease 40 is, the smaller the thickness of the space 41 is, and the larger the surface area is between the inner circumferential surface of the cylinder portion 38 and the outer circumferential surface of the damper rod 39 (in other words, the longer the circumferential length of the space 41 is). Moreover, the resistance force becomes larger when the expandable damper 35 expands or contracts with much energy (when the expansion and contraction speed is fast), and becomes smaller when the expandable damper 35 expands or contracts with less energy (when the expansion and contraction speed is slow).

In this example, an expandable damper is employed as the damper, so it is necessary to be able to effectively prevent the adjustment lever 32 from rotating with much energy when rotating the adjustment lever 32 downward from the state illustrated in FIG. 9A(b) or FIG. 9B(b) to the state illustrated in FIG. 9A(a) or FIG. 9B(a) in order to adjust the position of the steering wheel 1 by making the resistance against the force in the direction of expansion and contraction of the expandable damper 35 (damper performance) a desired value by properly regulating the viscosity of the grease 40, the thickness of the space 41, and the surface area between the inner circumferential surface of the cylinder portion 38 and the outer circumferential surface of the damper rod 39. On the other hand, it is necessary to regulate the installation direction and installation position of the expandable damper 35 so that it is possible to keep the resistance low when pivotally displacing the steering column between the states in FIG. 9A(a) and FIG. 9B(a) in order to adjust the up-down position of the steering wheel 1 when the adjustment lever 32 is in a state of being rotated downward. Furthermore, in order to prevent grease 40 inside the space 41 from being pushed out and lost due to expansion and contraction of the expandable damper 35, it is necessary to regulate the construction and the posture in the installation state of the expandable damper 35. These points will be explained below.

First, the construction of the connecting portions for supporting both end portions of the expandable damper 35 will be explained. In order to connect the tip-end portion of the damper rod 39 to the tip-end portion of the protrusion 34, a tip-end-side flange portion 42 is formed around the tip-end portion of the damper rod 39. In this example, an insertion hole 43 such as illustrated in FIG. 6A is formed in the tip-end-side flange portion 42. The tip-end-side flange portion 42 can be connected with the connecting hole 36 of the protrusion 34 by a rivet, small screw, bolt or the like that is loosely inserted through the insertion hole 43 and connecting hole 36 so as to be able to pivotally displace.

Alternatively, it is possible to provide a mushroom-shaped elastic leg piece such as illustrated in FIG. 6B on the tip-end-side flange portion 42. In this case, the outer diameter of the maximum diameter portion of the elastic leg piece 44 is elastically contracted and the elastic leg piece 44 is inserted into the connecting hole 36. In the inserted state, it becomes possible for the damper rod 39 to pivotally displace with respect to the tip-end-side flange portion 42 due to the space that exists between the inner circumferential surface of the connecting hole 36 and outer circumferential surface of the elastic leg piece 44, or due to elastic deformation of the elastic leg piece 44. The elastic leg piece 44 or rivet or the like correspond to a pivot shaft arranged in the width direction.

A base-end-side flange portion 45 is formed on the base-end portion of the cylinder portion 38, and an insert through hole 43a such as illustrated in FIG. 7A is provided in the base-end-side flange portion 45. The base-end-side flange portion 45, as in the case of the tip-end-side flange portion 42 of the damper rod 39, is connected with a connecting hole (not illustrated) that is formed in the rear-end portion of the extending portion 37 so as to be able to pivotally displace. It is also possible to provide an elastic leg piece 44a as illustrated in FIG. 7B on the base-end-side flange portion 45.

Both end portion of the expandable damper 35 must be connected to and supported by the tip-end portion of the protrusion 34 and the rear-end portion of the extending portion 37 so as to be able to pivot and to displace in the axial direction of the adjustment rod 24. In order for this, in this example, between the state in which position adjustment of the steering wheel 1 is possible, and the state in which the adjusted position of the steering wheel 1 is maintained, the protrusion 34 is able to displace in the axial direction of the adjustment rod 24 by the amount of the expansion and contraction stroke of the cam apparatus 31 (for example, 1 mm to 2.5 mm). Moreover, both end portion of the expandable damper 35 are connected to the protrusion 34 or extending portion 37 so as to be able to pivotally displace, so it is possible to absorb the relative displacement between the protrusion 34 and the extending portion 37 due to the expansion and contraction stroke of the com apparatus 31.

Figure 3:
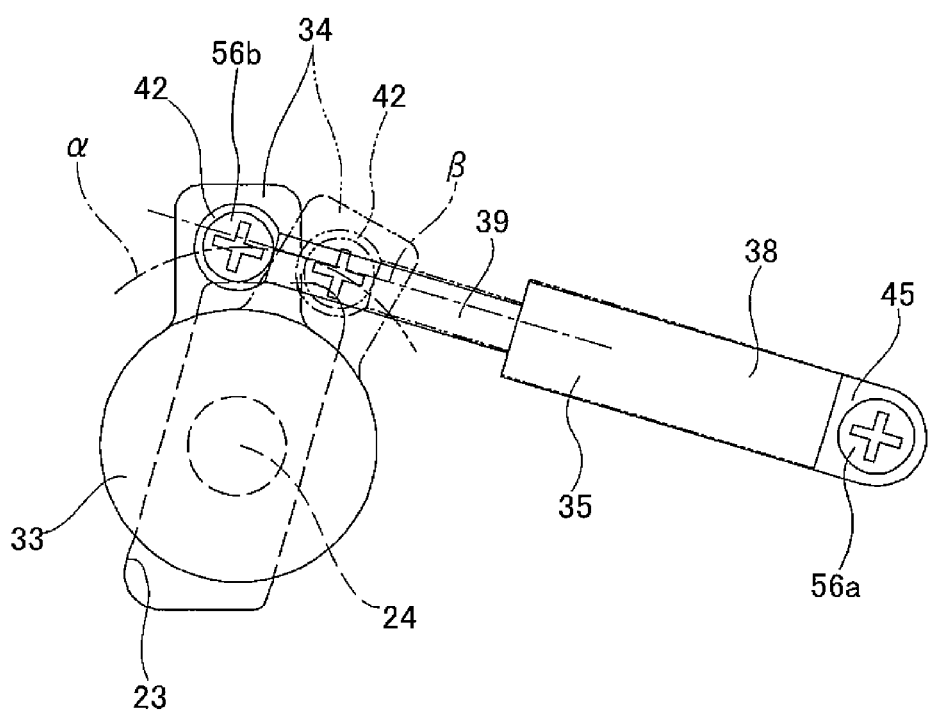
FIG. 3 is a partial side view of a portion that corresponds to the center portion of FIG. 1 illustrating an expandable damper installation portion removed from the apparatus illustrated in FIG. 1.
Figure 4:
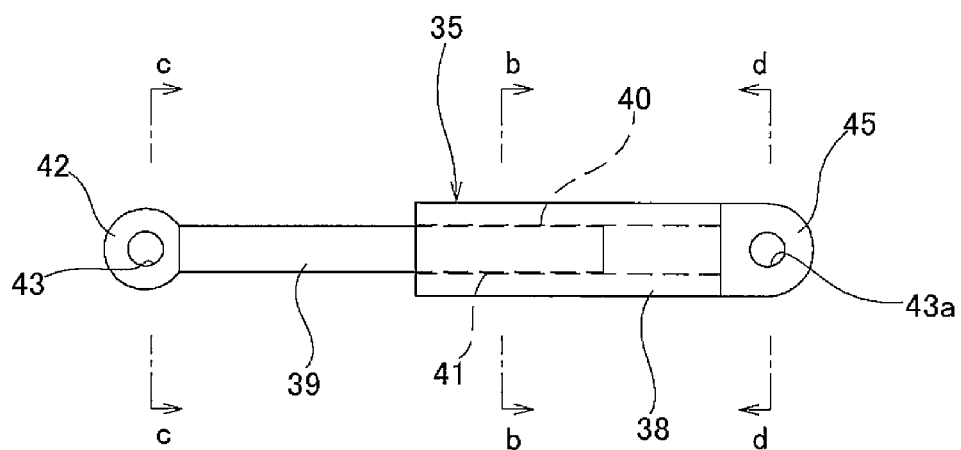
FIG. 4 is a side view illustrating an expandable damper that is removed from the apparatus illustrated in FIG. 1.
Figure 5:
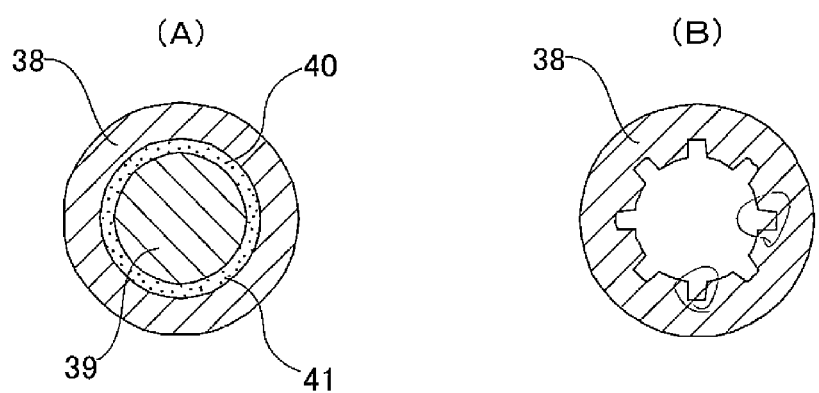
FIG. 5A is an enlarged cross-sectional view of section b-b in FIG. 4 illustrating the construction of the expandable damper illustrated in FIG. 1.
FIG. 5B is a cross-sectional view that corresponds to FIG. 5A and illustrates another example of an expandable damper with the adjustment rod omitted that can be applied to the apparatus illustrated in FIG. 1.
Figure 6:
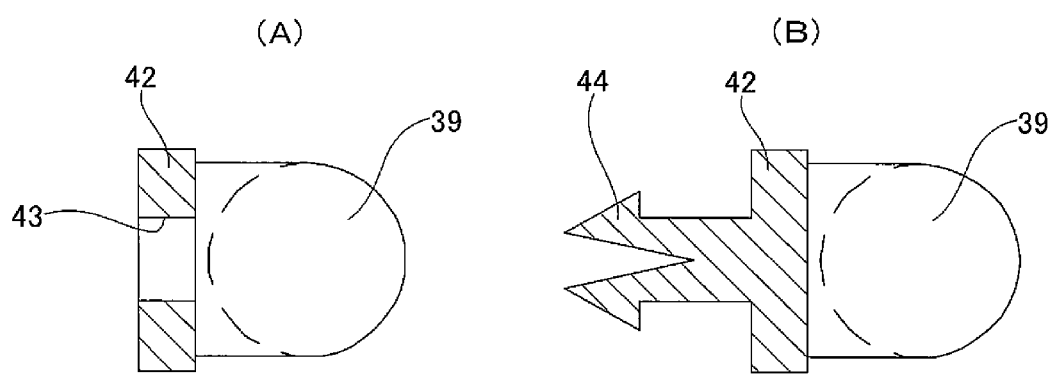
FIG. 6A is an enlarged cross-sectional view of section c-c in FIG. 4 illustrating the shape of the tip-end portion of a rod for connecting to an opposing member in the expandable damper of the apparatus illustrated in FIG. 1.
FIG. 6B is a cross-sectional view that corresponds to FIG. 6A illustrating another example of the shape of the tip-end portion of a rod that can be applied in the expandable damper of the apparatus illustrated in FIG. 1.
Figure 7:
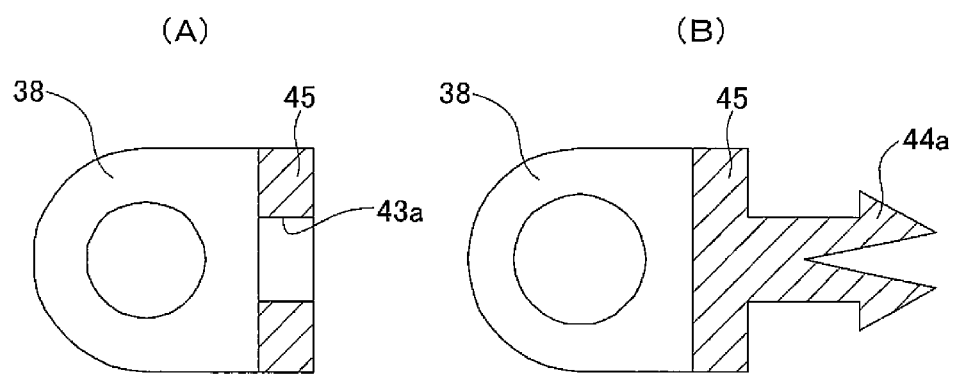
FIG. 7A is an enlarged cross-sectional view of section d-d in FIG. 4 illustrating the shape of the base-end portion of a cylinder tube for connecting to an opposing member in the expandable damper of the apparatus illustrated in FIG. 1.
FIG. 7B is a cross-sectional view that corresponds to FIG. 7A illustrating another example of the shape of the base-end portion of a cylinder tube that can be applied to the expandable damper of the apparatus illustrated in FIG. 1.

In this example, sufficient damper performance is displayed by the expandable damper 35 when rotating the adjustment lever 32 downward, however, in order to keep the resistance against adjusting the up-down position of the steering wheel 1 after the adjustment lever 32 has been rotated downward low, the installation direction of the expandable damper 35 is suitably regulated. When rotating the adjustment lever 32 downward, the amount of contraction of the expandable damper 35 is increased (the contraction speed is fast), and the shearing resistance that works on the grease 40 is increased. In order for this, it is preferable that as illustrated in FIG. 3, in a state in which the adjustment rod 24 is located at the center position in the up-down direction of the long hole 23 in the up-down direction, or in other words, in a state in which the steering wheel 1 is located in the center position in the up-down direction of the adjustable range, the expandable damper 35 is arranged in a direction as described below. That is, the expandable damper 35 is arranged in the direction of tangent line $\beta$ that is tangent to the arc $\alpha$ centered around the adjustment rod 24 as indicated by the single-dot chain line in FIG. 3, at the portion of the connecting hole 36 that is formed in the tip-end portion of the protrusion 34 (at the center portion in the displacement direction). The position of the expandable damper 35 changes a little due to the rotation of the adjustment lever 32. Therefore, the installation direction of the expandable damper 35 is regulated so that the direction of the center axis of the expandable damper 35 changes across the tangent line $\beta$ direction. This installation direction can be arbitrarily regulated by selecting the installation position of the protrusion 34 and the installation position of the extending portion 37.

Figure 10:
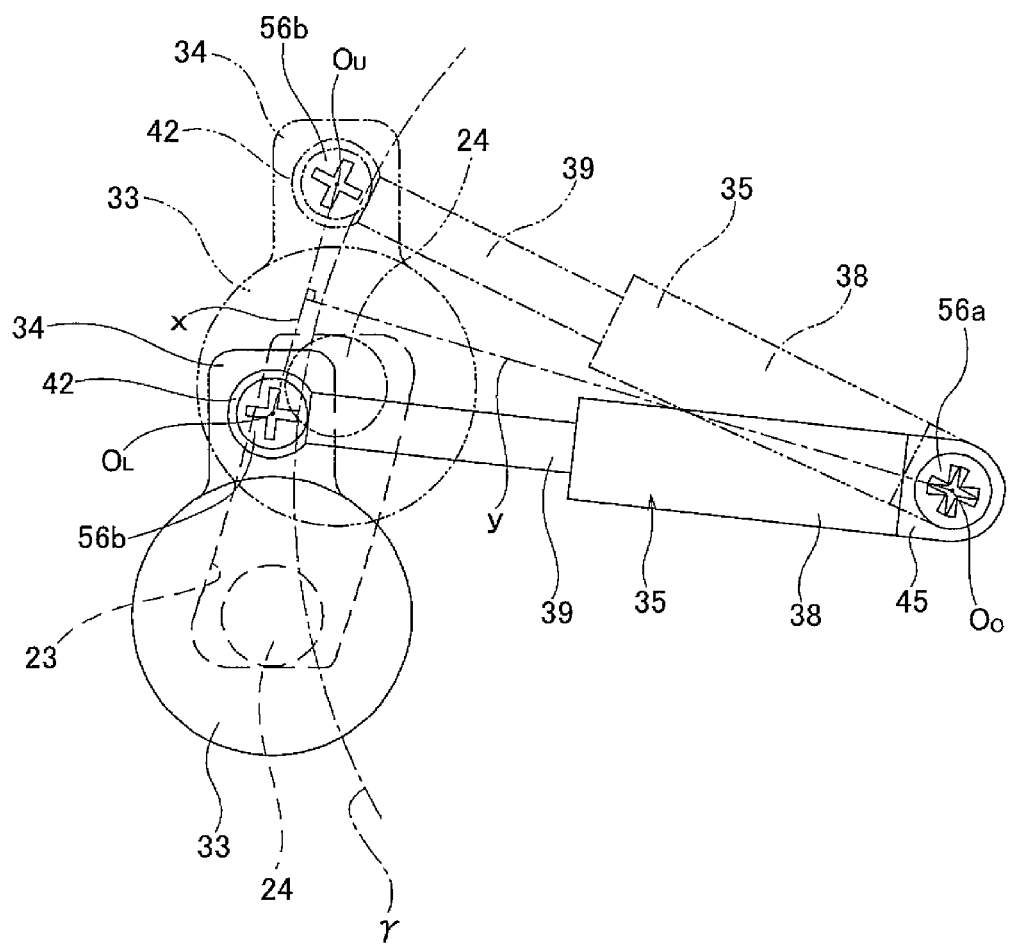
FIG. 10 is a view that corresponds to FIG. 3, and explains a preferred installation position of the expandable damper in the apparatus illustrated in FIG. 1.
Figure 11:
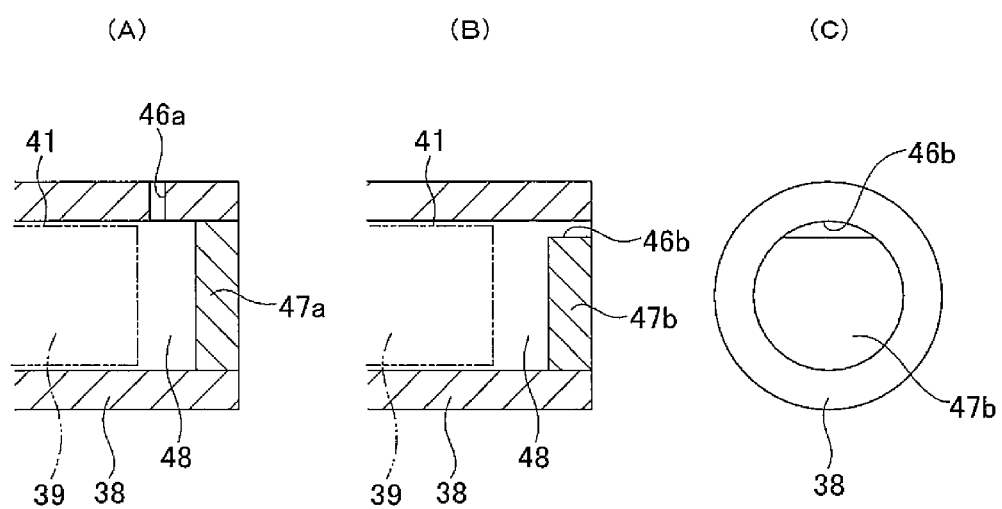
FIG. 11A is a cross-sectional view of the base-end portion of the cylinder tube illustrating a first example of the shape of an airflow path in the expandable damper of the apparatus illustrated in FIG. 1.
FIG. 11B is a cross-sectional view of the base-end portion of the cylinder tube illustrating a second example of the shape of an airflow path.
FIG. 11C is a view as seen from the right in FIG. 11B.

Moreover, in this example, in order to keep the resistance against adjustment of the up-down position of the steering wheel 1 low, the position of the connecting portion between both end portions of the expandable damper 35 and the opposing members is regulated, so that the amount of expansion and contraction of the expandable damper 35 when raising the adjustment rod 24 together with the outer column 16 is kept small. FIG. 10 illustrates the state in which adjustment of the up-down position of the steering wheel 1 is made possible by rotating the adjustment lever 32 downward as illustrated in FIG. 9A(a) and FIG. 9B(a). In this example, as illustrated by the two-dot chain line in FIG. 10, in a state in which the adjustment rod 24 is moved to the top-end portion of the long hole 23 in the up-down direction, and the steering wheel 1 is located at the top position of the adjustable range, the center position of the connecting portion (insert through hole 43 or elastic leg piece 44) on the tip-end side of the damper rod 39 is taken to be the center position on the top side $O_U$. Moreover, in a state in which the adjustment rod 24 is moved to the bottom-end portion of the long hole 23 in the up-down direction, and the steering wheel 1 is located at the bottom end of the adjustable range, the center position of the connecting portion on the tip-end side of the damper rod 39 is taken to be the center position on the bottom side $O_L$. The line x is taken to be the line that connects the center position on the top side $O_U$ with the center position on the bottom side $O_L$, and the line y is taken to be the perpendicular bisector of the line x. Then, the center position $O_O$ of the connecting portion (insert through hole 43a or elastic leg piece 44a) between the base-end portion of the cylinder portion 38 and the extending portion 37 of the support-plate portion 15c is located on the perpendicular bisector y of the line x.

By regulating the position of the connecting portions of both end portions of the expandable damper 35, the adjustment rod 24 moves in a nearly tangential direction to the arc γ that is centered around the center position $O_O$ on the base-end side when the adjustment rod 24 is moved along the long hole 23 in the up-down direction in order to adjust the up-down position of the steering wheel 1. Therefore, it is possible to keep the amount of change in the distance between the center position $O_O$ on the base-end side and the center position of the connecting portion on the tip-end side of the damper rod 39, which is the center position on the tip-end side, small. As a result, it is also possible to keep the amount of expansion or contraction of the expandable damper 35 small. As explained above, the shearing resistance of the grease 40 in the space between the inner circumferential surface of the cylinder portion 38 and the outer circumferential surface of the damper rod 39 becomes larger the faster the relative displacement speed between these circumferential surfaces is. In other words, when the relative displacement speed is slow, it is possible to keep the sheering resistance of the grease low, and thus the resistance by the expandable damper 35 is kept small. Therefore, by locating the center position $O_O$ of the connecting portion between the base-end portion of the cylinder portion 38 and the extending portion 37 of the support-plate portion 15c on the perpendicular bisector y of the line x, as in this example, the expandable damper 35 is kept from becoming a resistance when adjusting the height of the steering wheel 1, so that the height of the steering wheel 1 can be adjusted with little force. This effect can also be obtained by locating the center position $O_O$ of the base-end portion of the adjustment rod 24 near the perpendicular bisector y of the line x, or in other words, on a straight line that passes through the center point of the line x and is inclined with respect to the perpendicular bisector y of the line x by an angle having an absolute value of 10 degrees or less, or preferably 5 degrees or less.

Therefore, even when the present invention is applied to a steering apparatus having a tilt mechanism, by employing an expandable damper 35 as the damper and by appropriately regulating the installation positions of the connecting portions of both end portions of this expandable damper 35, it is possible to keep the amount of expansion or contraction of the expandable damper 35 small when adjusting the height position of the steering wheel 1. As a result, the resistance by the expandable damper 35 to the adjustment of the up-down position of the steering wheel 1 can be mostly ignored.

In this example, in order to prevent the grease 40 that is inside the space 41 from being pushed out and lost due to the expansion and contraction of the expandable damper 35, the construction and position in the installed state of the expandable damper 35 is regulated. In order to prevent the adjustment lever 32 from rotating downward with much energy using the expandable damper 35, it is necessary for there to be a sufficient amount of grease 40 inside the space 41. On the other hand, in the case of construction in which the back end of the cylinder portion 38 is completely blocked, and the damper rod 39 moves in the axial direction inside the cylinder portion 38, the pressure in the space at the back of the cylinder portion 38 rises when the amount that the damper rod 39 is pushed into the cylinder portion 38 increases. As a result, there is a possibility that the grease 40 inside the space 41 will be pushed out from the opening side of the cylinder portion 38 and be lost to the surrounding area. However, when the cylinder portion 38 is a simple cylindrical tube that is open on both ends, grease 40 that enters into the base-end side of the cylinder portion 38 from the space 41 due to the change in position of the expandable damper 35 can be lost as is to the surrounding area from the opening on the base-end side. In either case, as height position adjustment of the steering wheel 1 is repeatedly performed, the amount of grease 40 inside the space 41 may become insufficient, and there is a possibility that the damper performance of the expandable damper 35 will degrade.

In order to prevent the degradation of damper performance of the expandable damper 35 that occurs in this way, in this example, as illustrated in FIG. 11A, the base-end portion of the cylinder portion 38 is blocked except for an airflow path 46a that allows air in the space inside the cylinder portion 38 to be taken in or discharged. In other words, the entire opening on the base end of the cylinder portion 38 is blocked by a cover 47a, and an airflow path 46a that passes in the radial direction through the cylinder portion 38 is formed at the base-end portion of the cylinder portion 38. Alternatively, as illustrated in FIGS. 11B and 11C, it is also possible to block the opening on the base end of the cylinder portion 38 with a circular cover 47b with part removed, and for the portion between this removed portion and the inner circumferential surface of the base-end portion of the cylinder portion 38 to function as an airflow path 46b. In any of these forms of construction, with the expandable damper 35 spanning between the protrusion 34 and the extending piece 37, an airflow path 46a, 46b is formed at the top.

Moreover, even when the entire length of the expandable damper 35 is in the most contracted state, the lengths of the cylinder portion 38 and the damper rod 39 are regulated such that the base-end surface of the damper rod 39 does not strike against the back-end surface of the cylinder portion 38, and this remaining space 48 between the base-end surface and back-end surface functions to collect grease. Grease that comes out from the space 41 between the inner circumferential surface of the cylinder portion 38 and the outer circumferential surface of the damper rod 39 is accumulated in the space 48.

The airflow path 46a, 46b is arranged in a position such that grease inside the space 48 does not leak out through the airflow path 46a, 46b due to gravity regardless of the adjusted position of the steering wheel 1 or rotated position of the adjustment lever 32. In other words, the position of the expandable damper 35 changes between the case in which the steering wheel 1 is at the top position as illustrated in FIG. 9A, to the case in which the steering wheel 1 is at the bottom position illustrated in FIG. 9B. The position of the expandable damper 35 also changes between the case in which the adjustment lever 32 is rotated downward as illustrated in FIG. 9A(a) and FIG. 9B(a), and the case in which the adjustment lever 32 is rotated upward as illustrated in FIG. 9A(b) and FIG. 9B(b). In the state in which the steering wheel 1 is positioned at the top end, and the adjustment lever 32 is rotated downward as illustrated in FIG. 9A(a), the expandable damper 35 is inclined at a maximum in a direction that the bottom-end side of the expandable damper 35 becomes low. Even in the state illustrated in FIG. 9A(a), the volume of the space 48 and installation position of the airflow path 46a, 46b are regulated by the relationship of the amount of grease 40 that is filled inside the expandable damper 35 so that grease 40 that is inside the space 48 does not leak out to the outside. By doing so, a sufficient amount of grease is maintained inside the space 41 between the inner circumferential surface of the cylinder portion 38 and the outer circumferential surface of the damper rod 39 over a long period of time, and thus the damper performance of the expandable damper 35 is maintained over a long period of time.

In this example, the expandable damper 35 is used as the damper, however, as long as the facing surface area A between the inner circumferential surface of the cylinder portion 38 and the outer circumferential surface of the damper rod 39 is sufficiently maintained, a sufficient damper effect can be obtained by using an even more compact expandable damper. In this example, this facing surface area A is regulated so as to be 100 mm² to 800 mm², or more preferably, 150 mm² to 500 mm². Together with regulating the facing surface area A in this way, as described above, by regulating the viscosity of the grease 40 that is located between the inner circumferential surface of the cylinder portion 38 and the outer circumferential surface of the damper rod 39 to be within the range 500 to 50,000 mm²/s at 40° C., the unpleasant feeling experienced by the driver of the adjustment lever 32 is effectively prevented. In this example, the outer diameter of the damper rod 39 is 5 mm to 15 mm.

With the steering wheel position adjusting apparatus of this example, when the adjustment lever 32 is rotated in order to adjust the position of the steering wheel, rotation of the adjustment lever 32 with much energy is prevented. In other words, in this example, as the adjustment lever 32 is rotated downward, the overall length of the expandable damper 35 is contracted. As a result, there is resistance against the downward rotation of the adjustment lever 32, and thus the energy by which the adjustment lever 32 is rotated downward is lessened. Consequently, the unpleasant feeling experienced by the driver who operates the adjustment lever 32 is prevented.

The material of the cylinder portion 38 and the damper rod 39 of the expandable damper 35 is not particularly specified. However, by making the coefficient of linear expansion of the material on the radially inward side that constitutes the damper rod 39 greater than the coefficient of linear expansion of the material on the radially outward side that constitutes the cylinder portion 38, it is possible to keep change in the damper performance of the expandable damper 35 small (or idealistically keep the damper performance constant) regardless of change in the temperature. The reason for this is that by regulating the relationship of the coefficients of linear expansion of the materials of the cylinder portion 38 and the damper rod 39 as described above, the direction of the change in damper performance caused by a change in viscosity of the grease 40 due to the change in temperature, and the direction of the change in damper performance caused by a change in thickness of the space 41 between the inner circumferential surface of the cylinder portion and the outer circumferential surface of the damper rod 39 due to a change in temperature, are opposite each other. For example, in this example, when stainless steel (coefficient of linear expansion: 10 to 17×10⁻⁶/° C.) is used as the material for the cylinder portion 38, an aluminum alloy (coefficient of linear expansion: 23×10⁻⁶/° C.) or magnesium alloy (coefficient of linear expansion: 25×10⁻⁶/° C.) can be used as the material for the damper rod 39, and when an aluminum alloy or magnesium alloy is used as the material for the cylinder portion 38, polyacetal (coefficient of linear expansion: 100 to 110×10⁻⁶/° C.) can be used as the material for the damper rod 39. Moreover, as the material for the cylinder portion 38, polypropylene with graphite mixed (coefficient of linear expansion: 20 to 60×10⁻⁶/° C.) can be used, and polyacetal can be used as the material for the damper rod 39.

More specifically, at high temperature when the viscosity η of the grease 40 becomes low, the amount of thermal expansion of the damper rod 39 becomes greater than the amount of thermal expansion of the cylinder portion 38, and the thickness h of the space 41 becomes small. Conversely, at low temperature when the viscosity η of the grease 40 becomes high, the amount of thermal contraction of the damper rod 39 becomes greater than the amount of thermal contraction of the cylinder portion 38, and the thickness h of the space 41 becomes large. By taking the facing surface area between the inner circumferential surface of the cylinder portion 38 and the outer circumferential surface of the damper rod 39 to be A, and the friction coefficient between these surfaces and the grease 40 to be kF, then the viscous frictional force FN that acts between the inner circumferential surface of the cylinder portion 38 and the outer circumferential surface of the damper rod 39 (∝ (proportional to) damper performance) can be expressed by the following equation:

$$FN=(\eta \cdot A \cdot kF)/h$$

As is clear from this equation, the higher the viscosity η becomes, or the smaller the thickness h becomes, the greater the viscous frictional force that acts between the inner circumferential surface of the cylinder portion 38 and the outer circumferential surface of the damper rod 39 becomes, or in other words, the greater the damper performance of the expandable damper 35 becomes. Conversely, the lower the viscosity η becomes, or the larger the thickness h becomes, the smaller the damper performance of the expandable damper 35 becomes. By regulating the dimensional relationship between the coefficient of linear expansion of the cylinder portion 38, which is the material of the radially outward side, and of the damper rod 39, which is the material of the radially inward side as described above, the viscosity η and thickness h cause the damper performance of the expandable damper 35 to change in opposite directions of each other due to change in temperature. In other words, it is possible to keep the change in the value [η/h] small in the equation above. The remaining portion [A·kF] does not change much due to a change in temperature, so it is possible to keep the change in damper performance of the expandable damper 35 due to a change in temperature small, and regardless of the change in temperature, it is possible to keep fluctuation of the force required to operate the adjustment lever 32 small. As a result, the unpleasant feeling that is given to the driver who operates the adjustment lever can be further reduced.

Even in the case of using an expandable damper in which an orifice is assembled as the damper, or using a multi-disc type rotary damper as the damper, it is necessary to properly regulate the installation position and installation direction of the damper so that when the adjustment lever 32 is rotated downward a sufficient damper function will be displayed, and so that when rotating the adjustment lever 32 upward, the resistance against adjustment of the up-down position of the steering wheel 1 is kept low. However, this regulation can be appropriately performed by one skilled in the art by referencing the explanation of the expandable damper of this example.

Moreover, even when a screw mechanism is used instead of a cam apparatus as the expansion mechanism, by applying the damper mechanism of this example, the force required for rotating the adjustment lever 32 when the adjustment lever 32 is rotated to a position in order to adjust the position of the steering wheel 1 is prevented from becoming excessively light, and an unpleasant feeling that is experienced by the driver who operates the adjustment lever 32 is prevented. It is possible to use a known screw mechanism in the steering wheel position adjusting apparatus of this example.

Second Example

Figure 12:
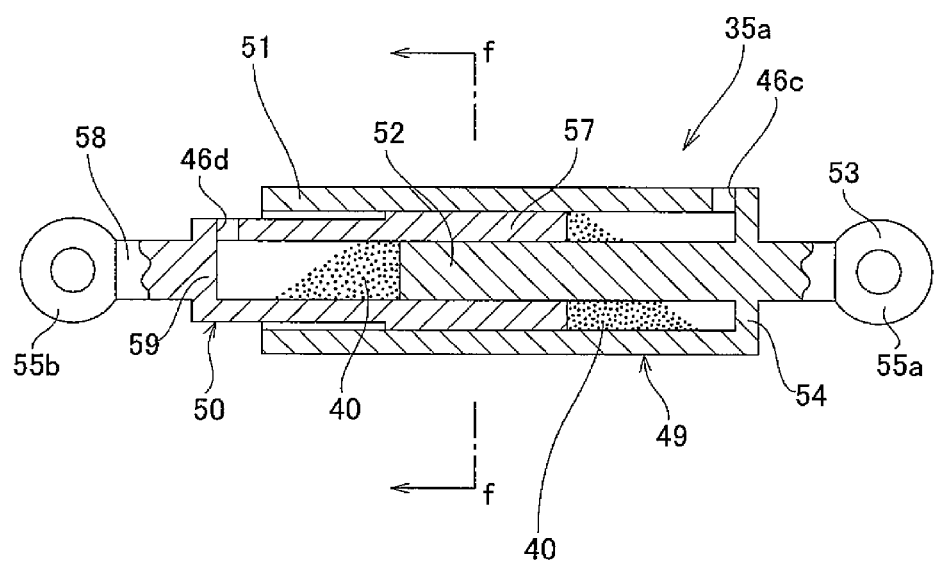
FIG. 12 is an enlarged cross-sectional view of the expandable damper of a second example of an embodiment of the present invention.
Figure 13:
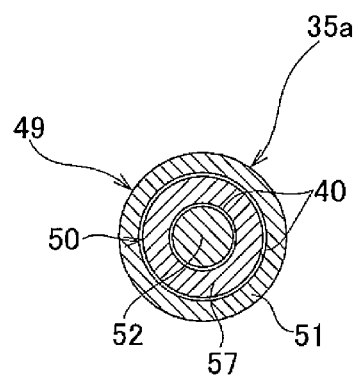
FIG. 13 is a cross-sectional view of section f-f in FIG. 12.

FIG. 12 and FIG. 13 illustrate an expandable damper 35a of a steering wheel position adjusting apparatus of a second example of an embodiment of the present invention. A feature of this example is increasing and stabilizing the damping performance of this expandable damper by devising construction of the expandable damper. The construction and functions of the other parts are the same as in the first example of an embodiment.

The expandable damper 35a of this example is constructed by combining a first sliding member 49 and second sliding member 50 so as to be able to slide in the axial direction by way of a film of grease 40, and this becomes resistance against a force in a direction that would cause the overall length to expand or contract.

The first sliding member 49 has an radially outward cylinder portion 51, an radially inward sliding portion 52 and a first installation portion 53. The radially outward cylinder portion 51 has a cylindrical shape with a bottom, and an airflow path 46c that passes through the inner circumferential surface and outer circumferential surface is provided at the top of the base end of the radially outward cylinder portion 51. The radially inward sliding portion 52 has a circular column shape, and is placed in the center portion of the radially outward cylinder portion 51 so as to be concentric with the radially outward cylinder portion 51. Moreover, the overall length in the axial direction of the radially inward sliding portion 52 is shorter than the overall length of the radially outward cylinder portion 51, and the tip-end surface of the radially inward sliding portion 52 is located a little further toward the back side than the edge of the opening end of the radially outward cylinder portion 51.

The base-end portion of the radially outward cylinder portion 51 and the base-end portion of the radially inward sliding portion 52 are connected and fastened together by the first installation portion 53. The first installation portion 53 has: a circular plate-shaped first bottom plate portion 54 that blocks off the base-end portion of the radially outward cylinder 51 and connects and fastens the base-end portions of the radially outward cylinder portion 51 and the radially inward sliding portion 52; and an installation ring portion 55a that is provided so as to protrude from the center portion of the outer surface of the first bottom plate portion 54. When assembled in the steering wheel position adjusting apparatus, the first installation portion 53 is supported by the extending portion 37 (see FIG. 1, FIG. 2 and FIG. 9) that is provided on the support-plate portion 15c of the support bracket 14b by way of a screw 56a (see FIG. 1 to FIG. 3, and FIG. 10) that is inserted through the installation ring portion 55a, and is able to pivotally displace.

The second sliding member 50 has an radially inward cylinder portion 57 and a second installation portion 58. The radially inward cylinder portion 57 has a cylindrical shape with a bottom, and has an outer diameter that is a little less than the inner diameter of the radially outward cylinder portion 51, and an inner diameter that is a little larger than the outer diameter of the radially inward sliding portion 52. The radially inward cylinder portion 57 is loosely inserted inside the cylindrical-shaped cylinder space that is located between the inner circumferential surface of the radially outward cylinder portion 51 and the outer circumferential surface of the radially inward sliding portion 52. In this state, grease 40 is located in the minute cylindrical-shaped space that is between the outer circumferential surface of the radially inward cylinder portion 57 and the inner circumferential surface of the radially outward cylinder portion 51, and the inner circumferential surface of the radially inward cylinder portion 57 and the outer circumferential surface of the radially inward sliding portion 52.

An airflow path 46d that corresponds to the airflow path 45c provided on the top of the base end of the radially outward cylinder portion 51 is provided on the top of the base end of the radially inward cylinder portion 57. The outer diameter of the base-end half portion of the radially inward cylinder portion 57 is smaller than the outer diameter of the tip half portion of the radially inward cylinder portion 57, and even when the overall length of the expandable damper 35a becomes short, and the length of the fit between the radially outward cylinder portion 51 and the radially inward cylinder portion 57 becomes long, the inside space and outside space of the radially inward cylinder portion 57 are surely connected.

The second installation portion 58 has: a second bottom plate portion 59 that blocks off the base-end portion of the radially inward cylinder portion 57; and an installation ring portion 55b that protrudes from the center portion on the outside surface of the second bottom plate portion 59. When assembled in the steering wheel position adjusting apparatus, the second installation portion 58 is supported by the protrusion 34 (see FIG. 1 to FIG. 3, FIG. 9 and FIG. 10) that is provided on the boss portion 33 of the adjustment lever 32 by way of a screw 56b (see FIG. 1 to FIG. 3, and FIG. 10) that is inserted through the installation ring portion 55b, and is able to pivotally displace.

In the case of the construction of this example, there are concentric circular films of grease 40 at two locations inside the expandable damper 35a that become a resistance to expansion or contraction of the expandable damper 35a, so even when the expandable damper 35a is compact, it is possible to obtain a sufficient damping effect, and even when the installation space is limited, it is possible to lessen the unpleasant feeling that is experienced by the driver who operates the adjustment lever 32. Moreover, even when a force is applied to the expandable damper 35a in twisting direction, and the radially outward cylinder portion 51 and radially inward sliding portion 52, and the radially inward cylinder portion 57 shift in the circumferential direction, the films of grease 40 do not disappear, and there is no large change in the film thickness of the films of grease 40. Therefore, there is no change in the resistance required for expansion or contraction of the overall length of the expandable damper 35a. Consequently, it is possible to always display a stable damping resistance, and it is possible to further reduce the unpleasant feeling given to the driver who operates the adjustment lever 32.

Third Example

Figure 14:
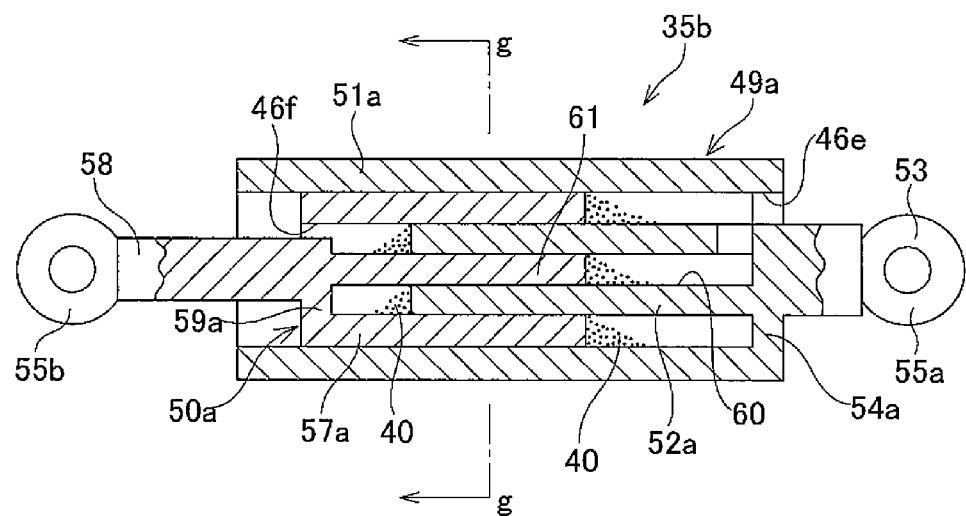
FIG. 14 is an enlarged cross-sectional view of the expandable damper of a third example of an embodiment of the present invention.
Figure 15:
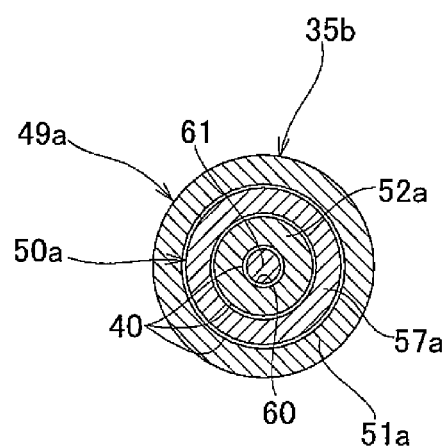
FIG. 15 is a cross-sectional view of section g-g in FIG. 14.

FIG. 14 and FIG. 15 illustrate a third example of an embodiment of the present invention. In the case of the construction of this example, three cylindrical shaped and concentric films of grease 40 are provided between a first sliding member 49a and a second sliding member 50a. In order for this, in the expandable damper 35b of this example, an radially inward sliding portion 52a is cylindrical shaped having a center hole 60, and a center sliding portion 61 that has a circular column shape and that is provided in the center portion of the radially inward cylinder portion 57a is loosely inserted inside the circular hole 60. The circumferential surfaces of the first sliding member 49a and second sliding member 50a are made to face each other in the radial direction at three locations that are concentric circular shapes in the radial direction: which are the portion where the outer circumferential surface of the center sliding portion 61 faces the inner circumferential surface of the radially inward sliding portion 52a; the portion where the outer circumferential surface of the radially inward sliding portion 52a faces the inner circumferential surface of the radially inward cylinder portion 57a; and the portion where the outer circumferential surface of the radially inward cylinder portion 57a faces the inner circumferential surface of the radially outward cylinder portion 51a of the first sliding member 49a. Airflow paths 46e, 46f for allowing air to flow during expansion or contraction of the expandable damper 35b are provided on the top-end portion of the first bottom-plate portion 54a of the first sliding member 49a, and the top-end portion of the second bottom-plate portion 59a of the second sliding member 50a.

In the case of the construction of this example, the films of grease 40 inside the expandable damper 35b are located at three locations that are concentric with each other, so it is possible to sufficiently maintain the damping effect of the expandable damper 35b. The construction and functions of the other parts are the same as in the first and second examples of an embodiment.

Fourth Example

FIGS. 16A to 16C and FIG. 17 illustrate a fourth example of an embodiment of the present invention. The expandable damper 35c of this example is constructed by combining a first sliding member 49b and a second sliding member 50b so that sliding in the axial direction by way of a grease film 40 is possible, and that sliding becomes resistance in the direction of a force that would expand or contract the overall length.

The first sliding member 49b has a cylinder portion 62 and a first installation portion 63. The cylinder portion 62 has a cylindrical shape with a bottom, and has an airflow path 46g that is provided in the top portion of the base end and passes through the inner circumferential surface and outer circumferential surface. The inner diameter of the cylinder portion 62 is small in the center portion in the axial direction, and becomes larger at both end portions in the axial direction. In other words, the inner circumferential surface of the cylinder portion 51 has a stepped shape that has a small-diameter portion 65 in the center portion in the axial direction, and large-diameter portions 66a 66b at both end portions in the axial direction. The large-diameter portions 66a, 66b constitute concave portion in the inner circumferential surface of the cylinder portion 62 that are recessed outward in the radial direction with respect to the small diameter portion 56 that is adjacent in the axial direction.

The first installation portion 63 has a circular plate shaped bottom-plate portion 64 that blocks off the base-end portion of the cylinder portion 62, and an installation ring portion 55c that protrudes from the center portion of the outer surface of the bottom-plate portion 64. When assembled in the steering wheel position adjusting apparatus, the first installation portion 63 is supported by the extending portion 37 (see FIG. 1, FIG. 2 and FIG. 9) that is provided on the support-plate portion 15c of the support bracket 14b by way of a screw 55a (see FIG. 1 to FIG. 3, and FIG. 10) that is inserted through the installation ring portion 55c, and is able to pivotally displace.

The second sliding member 50b has a piston portion 67 and a second installation portion 68. The piston portion 67 has an outer diameter that can be loosely inserted inside the small-diameter portion 65 of the cylinder portion 62. Moreover, the length $L_{67}$ in the axial direction of the piston portion 67 is less than the length $L_{65}$ in the axial direction of the small-diameter portion 65 ($L_{67}<L_{65}$). The second installation portion 68 protrudes from the center portion of the base-end surface of the piston portion 67, and has an installation ring portion 55d on the tip-end portion. When assembled in the steering wheel position adjusting apparatus, the second installation portion 68 is supported by the protrusion 34 (see FIG. 1 to FIG. 3, FIG. 9 and FIG. 10) that is provided on the boss portion 33 of the adjustment lever 32 by way of a screw 55b (see FIG. 1 to FIG. 3, and FIG. 10) that is inserted through the installation ring portion 55d.

The piston portion 67 of the second sliding member 50b is loosely inserted into the cylinder portion 62 of the first sliding member 49b. In this state, there is grease 40 in the cylindrical-shaped minute space that is between the outer circumferential surface of the piston portion 67 and the inner circumferential surface of the cylinder portion 62.

Figure 16:
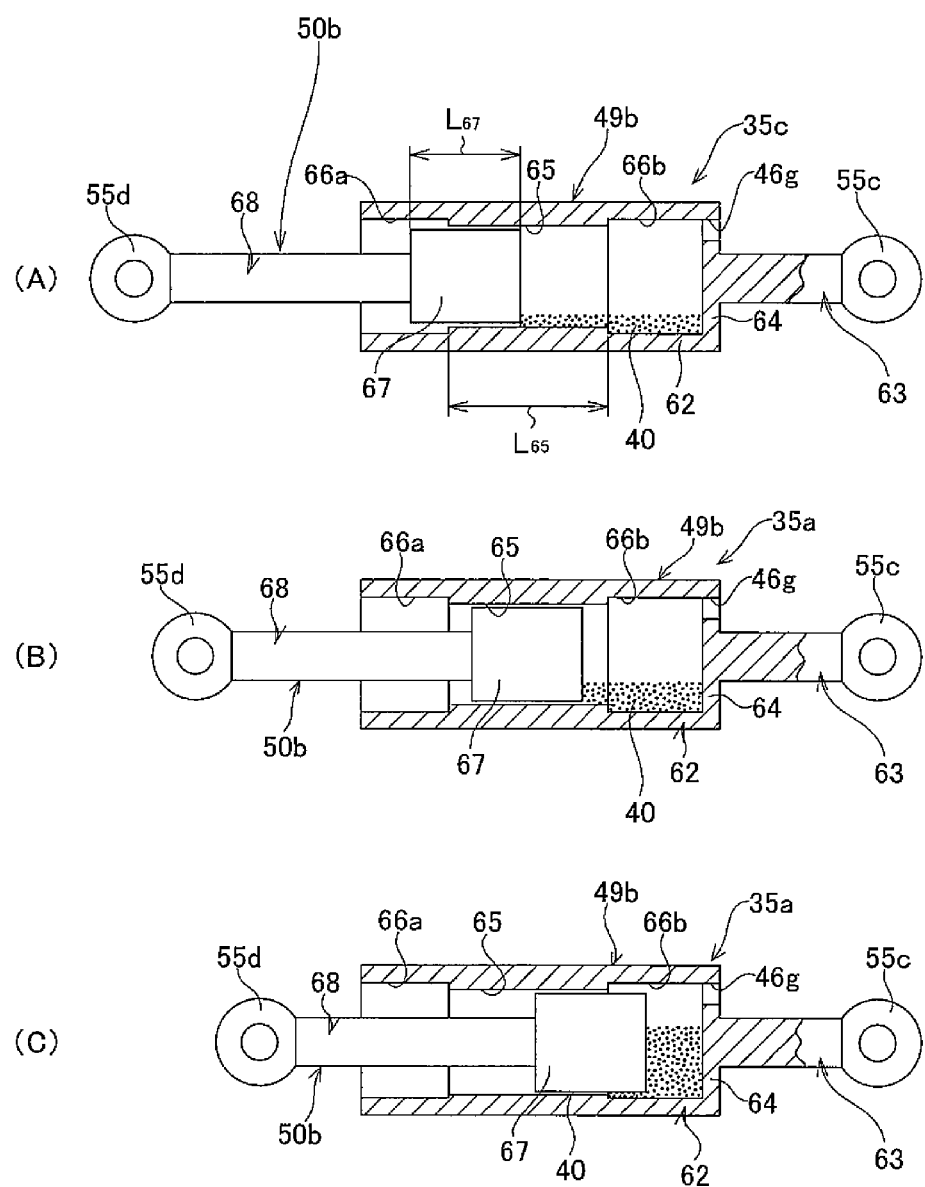
FIG. 16A to FIG. 16C are enlarged cross-sectional views illustrating a state in which the overall length of the expandable damper of a fourth example of an embodiment of the present invention changes.
Figure 17:
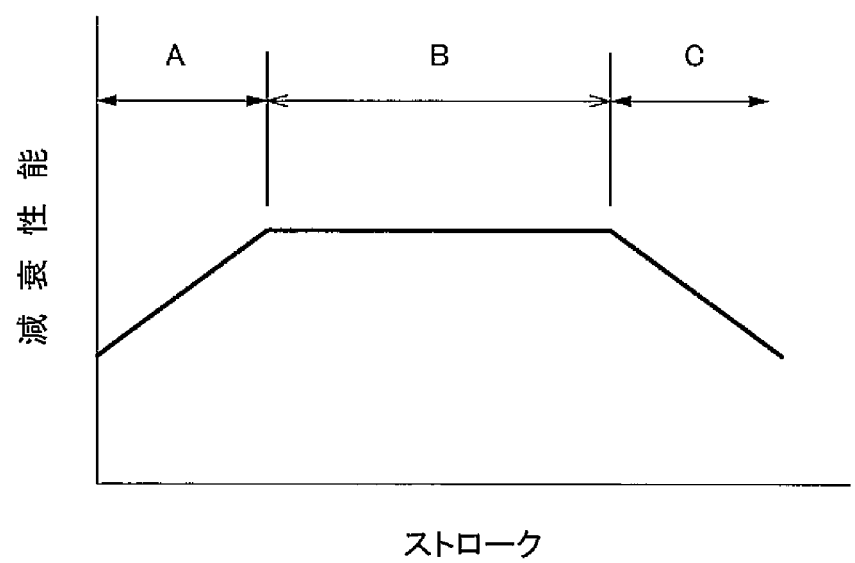
FIG. 17 is a graph illustrating the relationship between the expansion stroke and damping characteristic of the expandable damper illustrated in FIG. 16.

In the case of the construction of this example, the damping performance of the expandable damper 35c changes during operation as illustrated in FIG. 17. This will be explained using the case illustrated in FIG. 16A to FIG. 16C in which the overall length of the expandable damper 35c is contracted. First, as illustrated in FIG. 16A, in a state in which the expandable damper 35c is expanded, the portion near the base end of the piston portion 67 faces the large-diameter portion 66a of the inner circumferential surface of the cylinder portion 62. In this state, the dimension in the radial direction of the portion between the portion near the base end of the outer circumferential surface of the piston portion 67 and the large-diameter portion 66a of the inner circumferential surface of the cylinder portion 62 becomes large. As a result, even though there may be grease 40 in this portion, there is hardly any shearing resistance due to the grease 40 in this portion. The shearing resistance due to the grease 40 is seen to occur only in the portion where the portion near the tip end of the outer circumferential surface of the piston portion 67 faces the small-diameter portion 65 of the inner circumferential surface of the cylinder portion 62. Therefore, the damping performance of the expandable damper 35c is kept small.

During the process of contracting the overall length of the expandable damper 35c, as orderly illustrated in FIG. 16A to FIG. 16B, the facing surface area between the outer circumferential surface of the piston portion 67 and the small-diameter portion 65 gradually increases, and the damping performance of the expandable damper 35c gradually increases. Furthermore, during the process of even further contracting the overall length of the expandable damper 35c, as orderly illustrated in FIG. 16B to FIG. 16C, the tip-end portion of the outer circumferential surface of the piston portion 67 faces the large-diameter portion 66b of the inner circumferential surface of the cylinder portion 62, and again the facing surface area between the outer circumferential surface of the piston portion 67 and the small-diameter portion 65 decreases. As a result, the damping performance of the expandable damper 35c gradually decreases.

As a result, the damping performance of the expandable damper 35c changes as illustrated in FIG. 17 according to the stroke (overall length of the expandable damper 35c). That is, the damping performance in the middle section of the stroke of the expandable damper 35c increases, and on both end sections of the stroke, gradually decreases towards the both end sides. When beginning to operate the adjustment lever 32, in order to lessen the operating force, it is preferred that the damping performance be kept low. Moreover, just before the end of operation, the damping performance required for the expandable damper 35c becomes lower due to a decrease in the kinetic energy that is applied to the adjustment lever 32 from the cam apparatus 31. Therefore, by changing the damping performance of the expandable damper 35c as illustrated in FIG. 17, it is possible to further improve the operational feeling of operating the adjustment lever 32. As orderly illustrated in FIG. 16C to FIG. 16A, even when expanding the overall length of the expandable damper 35c, the damping performance of the expandable damper 35c as illustrated in FIG. 17 is obtained. The construction and functions of the other parts are the same as in the first through the third examples of an embodiment.

Fifth Example

Figure 18:
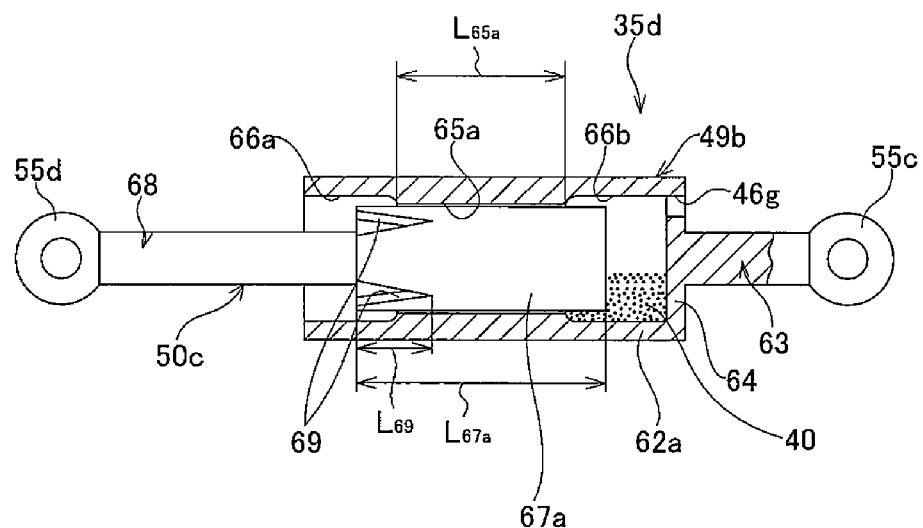
FIG. 18 is an enlarged cross-sectional view of an expandable damper of a fifth example of an embodiment of the present invention.
Figure 19:
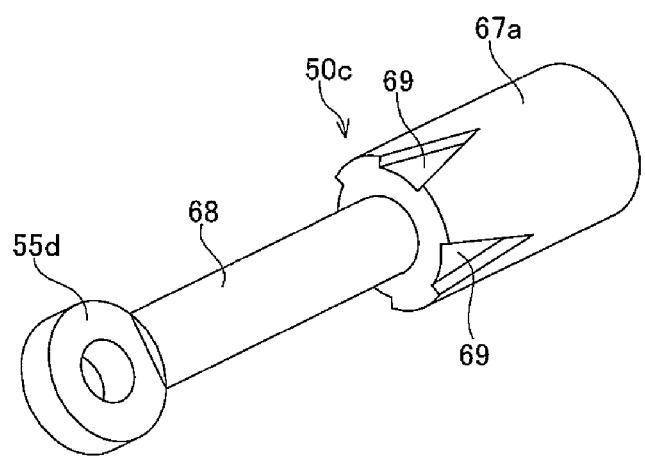
FIG. 19 is an enlarged perspective view illustrating a second sliding member that has been removed from the expandable damper illustrated in FIG. 18.
Figure 20:
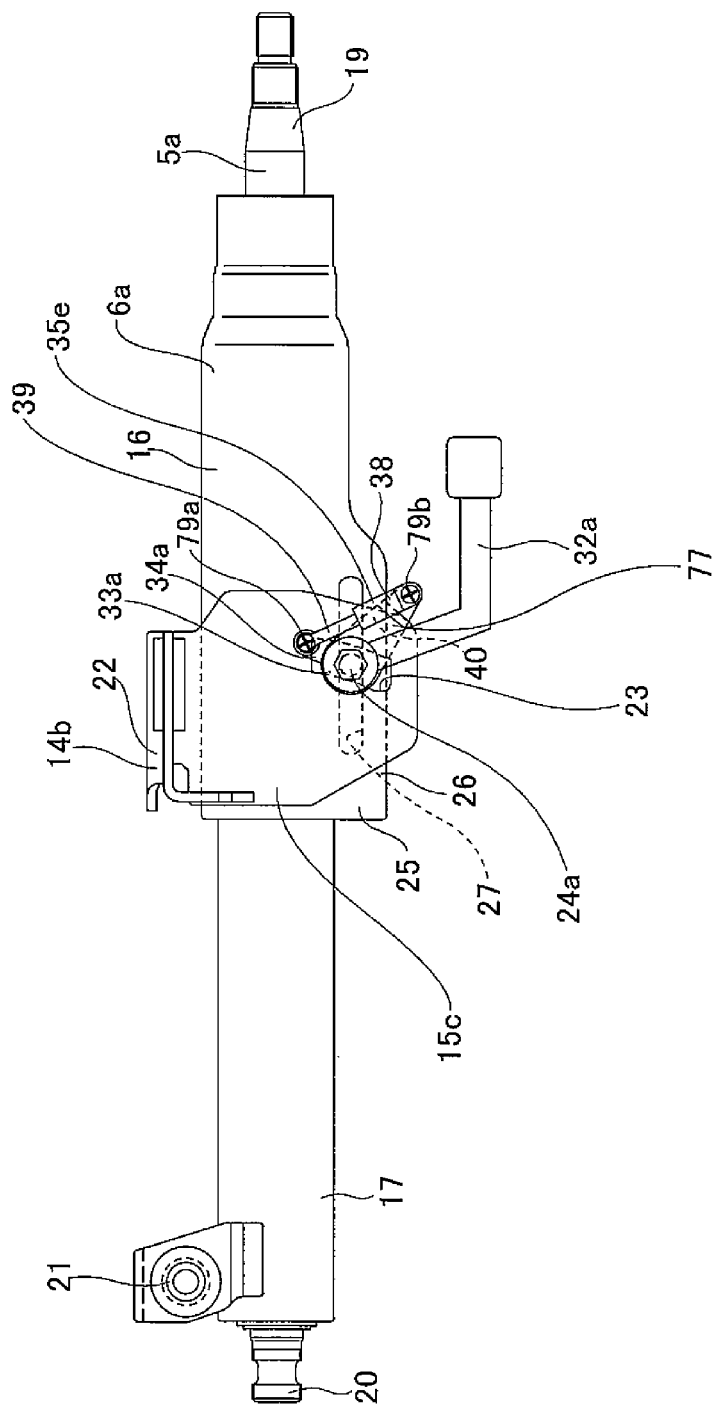
FIG. 20 is a side view illustrating a steering wheel position adjusting apparatus of a sixth example of an embodiment of the present invention.
Figure 21:
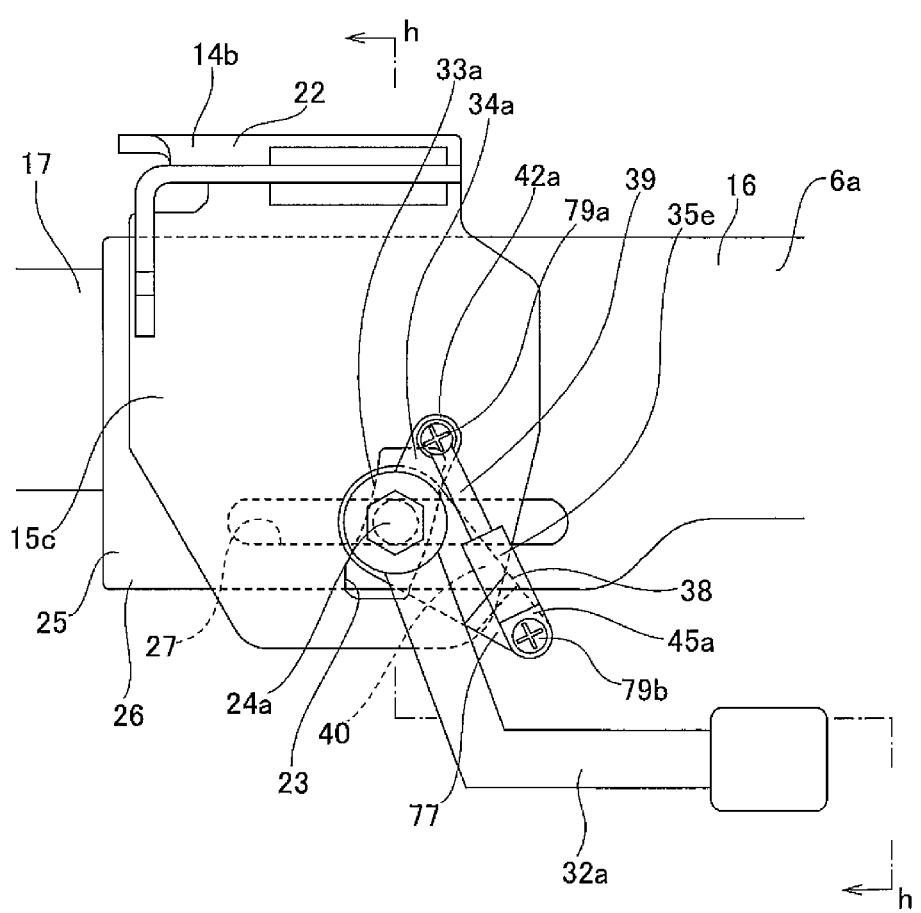
FIG. 21 is an enlarged view of the center portion in FIG. 20.
Figure 22:
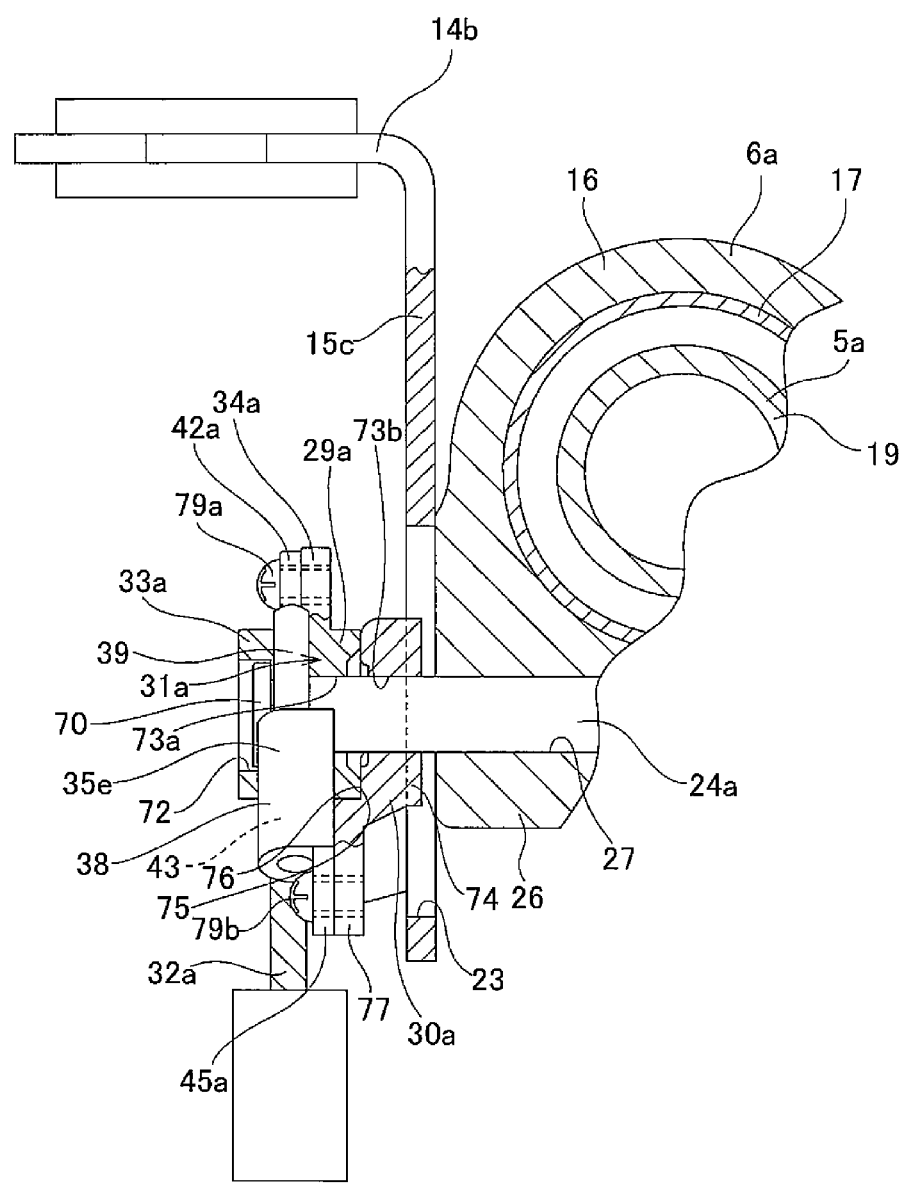
FIG. 22 is a cross-sectional view of section h-h in FIG. 21 with part omitted.
Figure 23:
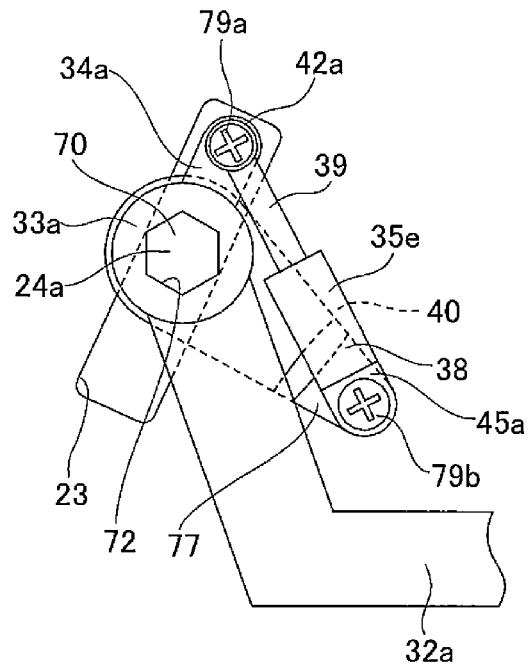
FIG. 23 is a partial side view as seen from the same direction as in FIG. 20 and FIG. 21, with major parts being removed from the apparatus illustrated in FIG. 20.
Figure 24:
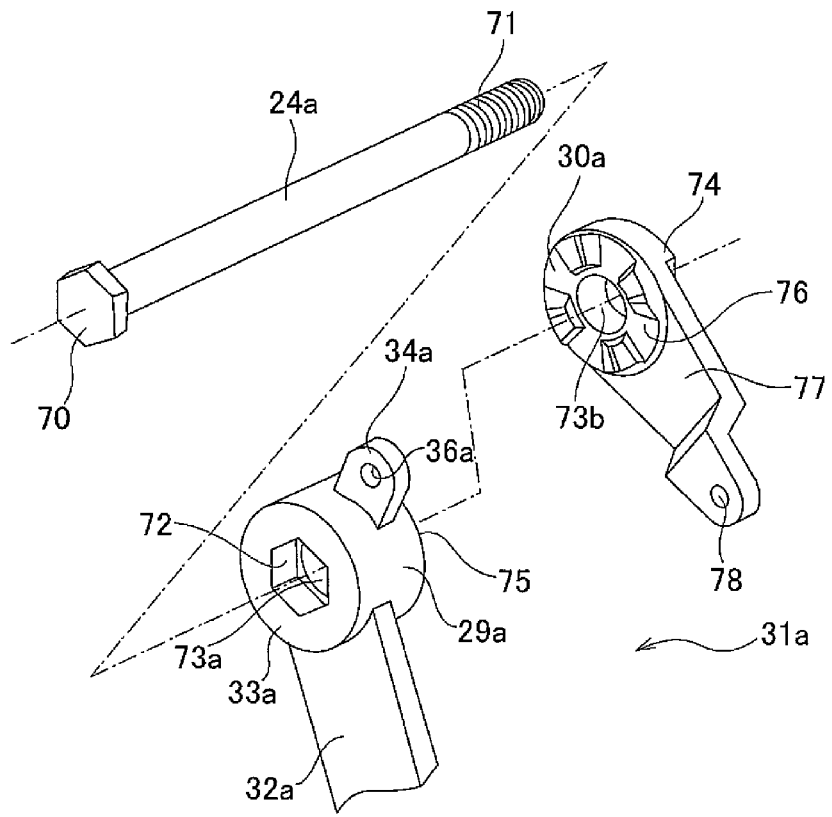
FIG. 24 is an exploded perspective view of the portion illustrated in FIG. 23.
Figure 25:
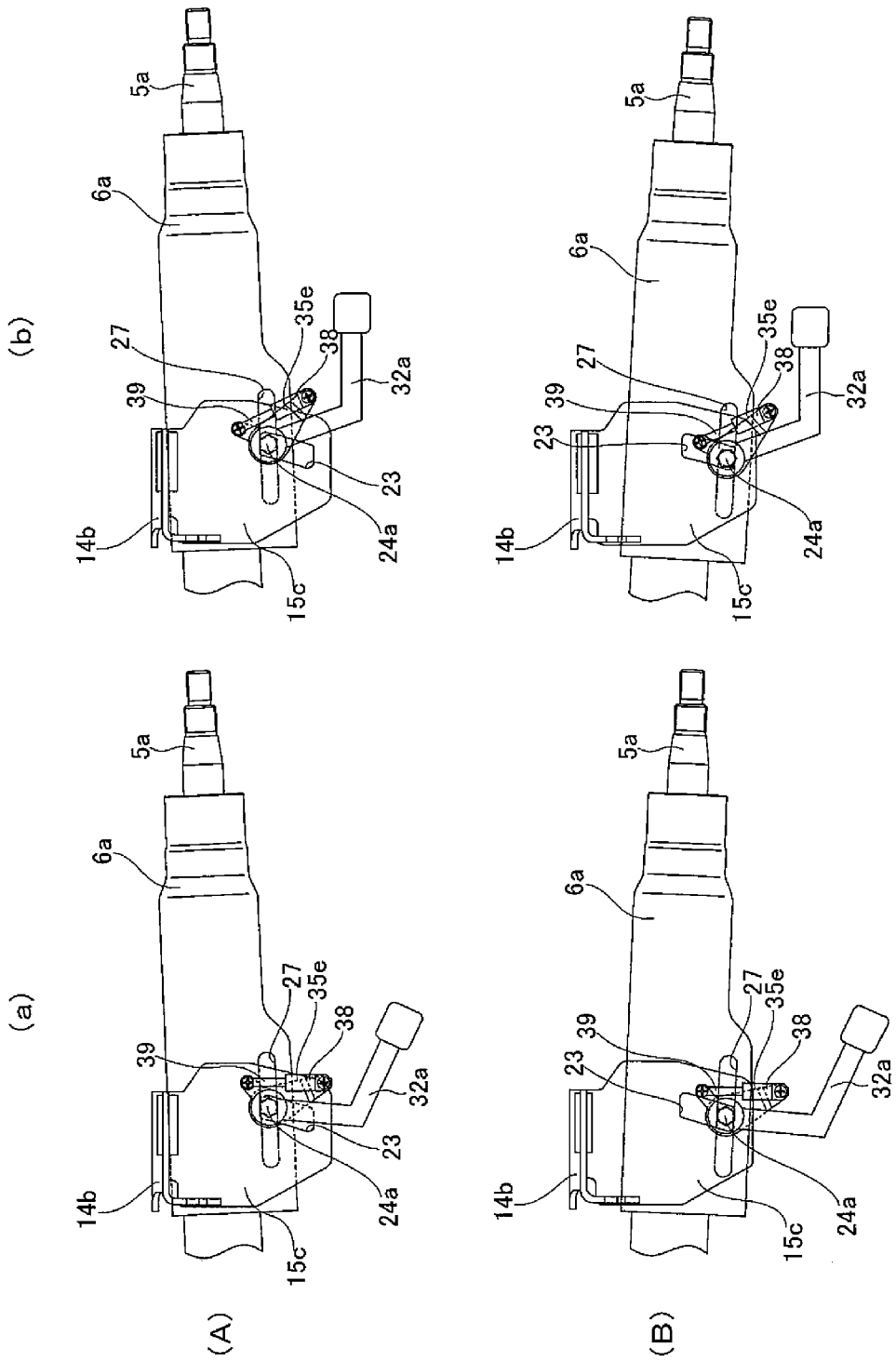
FIGS. 25A(a), (b) and FIGS. 25B(a), (b) are side views that correspond to FIGS. 9A(a), (b) and FIGS. 9B(a), (b) illustrating four examples of the change in position of the expandable damper during adjustment of the height position of the steering wheel in the apparatus illustrated in FIG. 20.
Figure 26:
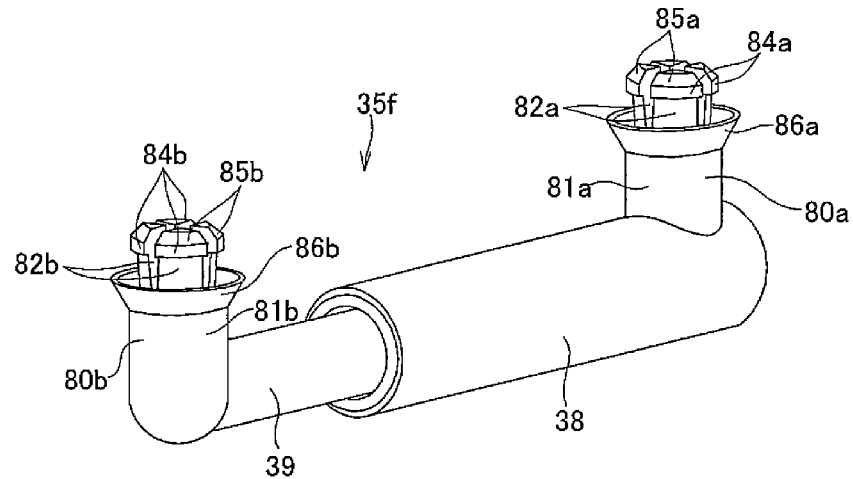
FIG. 26 is a perspective view illustrating an assembled state of an expandable damper of a seventh example of an embodiment of the present invention.
Figure 27:
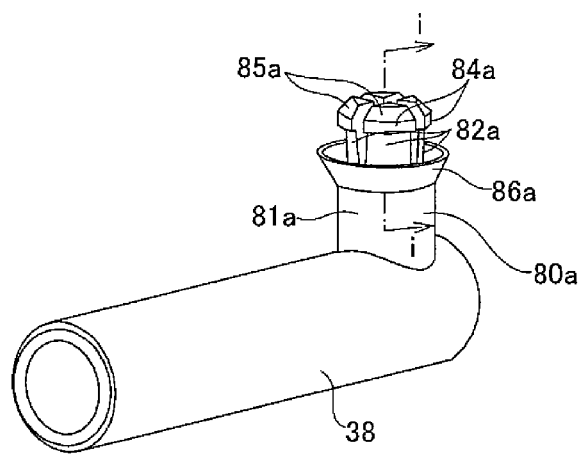
FIG. 27 is a perspective view of only the cylinder portion that has been removed from the expandable damper illustrated in FIG. 26 and seen from the same direction as in FIG. 26.
Figure 28:
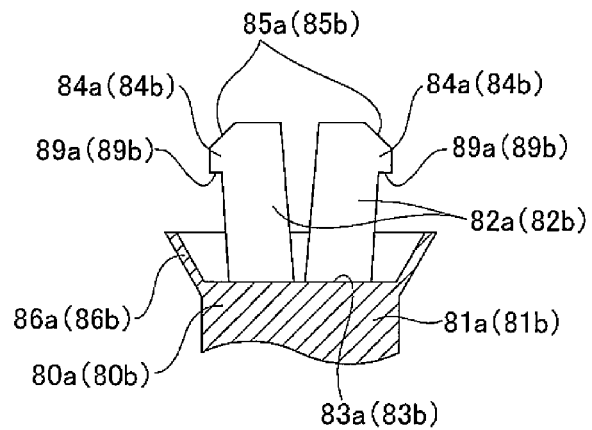
FIG. 28 is an enlarged cross-sectional view of section i-i in FIG. 27.
Figure 29:
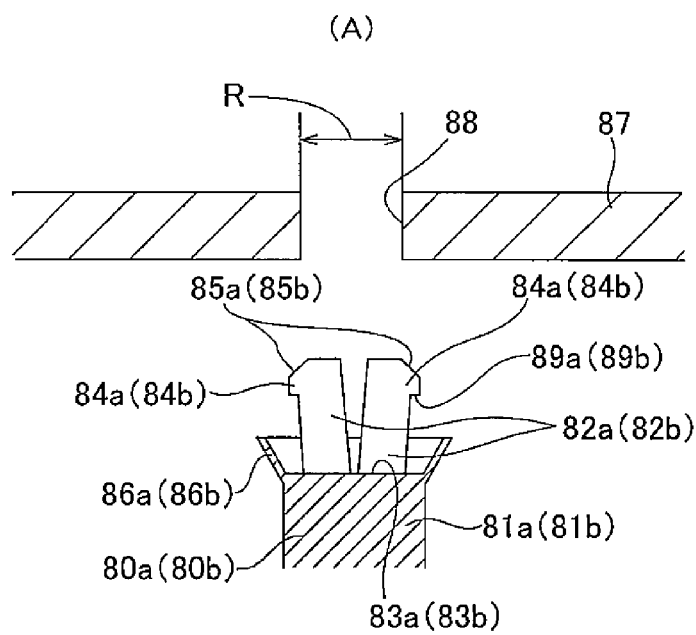
FIG. 29A and FIG. 29B are cross-sectional views that illustrate the order of the process for connecting the tip-end portion of a rod-shaped connecting portion and a connecting hole in the apparatus illustrated in FIG. 26.
Figure 29:
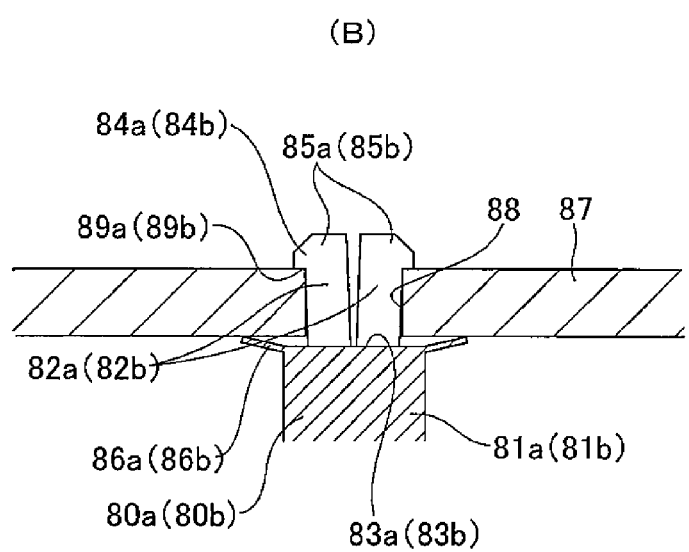

FIG. 18 and FIG. 19 illustrate a fifth example of an embodiment of the present invention. In the case of the construction of this example, the length $L_{67a}$ in the axial direction of a piston portion 67a of a second sliding member 50c is longer than the length $L_{65a}$ in the axial direction of a small-diameter portion 65a that is formed around the inner circumferential surface of the a cylinder portion 62a of a first sliding member 49c ($L_{65a} < L_{67a}$). A portion of the outer circumferential surface of the piston portion 67a faces the inner circumferential surface of the small-diameter portion 65a over the overall length in the axial direction of the small-diameter portion 65a. Instead of this, triangular shaped concave portions 69 are provided at a plurality of locations that are uniformly spaced in the circumferential direction from the base-end portion to the middle portion of the outer circumferential surface of the piston portion 67a. The base-end portions of these concave portions 69 are open to the base-end surface of the piston 67a, and the width dimension in the circumferential direction becomes narrower toward the tip-end side of the piston portion 67a. Furthermore, the length $L_{69}$ in the axial direction of these concave portions 69 is shorter than the length $L_{67a}$ in the axial direction of the piston portion 67a ($L_{69} < L_{67a}$). Therefore, the tip-end portions of these concave portions 60 are not open to the tip-end surface of the piston portion 67a. These concave portions 60 form concave portions in the outer circumferential surface of the piston portion 67a.

With the construction of the expandable damper 35d of this example, during the contraction process, in the final stage of the stroke, the damping performance decreases. Concave portions 69 as illustrated in FIG. 18 and FIG. 19 are symmetrically provided on both the base-end portion and tip-end portion of the piston 67a, and by properly regulating the position in the axial direction of these concave portions 69 as well as the length $L_{65a}$ in the axial direction and position in the axial direction of the small-diameter portion 65a, it is possible to gradually decrease the damping performance at both end sections of the stroke of the expandable damper 35d, and thus performance such as illustrated in FIG. 17 can be obtained. The construction and functions of the other parts are the same as in the first through the fourth examples of an embodiment.

Sixth Example

FIG. 20 to FIG. 29B illustrate a sixth example of an embodiment of the present invention. In the construction of this example, the adjustment rod 24a is constructed such that a non-circular (hexagonal shape in the example in the figure) head portion 70 is provided on the base-end portion (left-end portion in FIG. 24), and a male screw portion 71 is provided on the tip-end portion (right-end portion in FIG. 24). Moreover, a boss portion 33a is provided at the base-end portion of the adjustment lever 32a, and is integrated with a driven-side cam 29a of a cam apparatus 31a. A concave engaging portion 72 that fits over the head portion 70 is formed in the outside surface of the boss portion 33a. The adjustment rod 24a is inserted through a center hole 73a of the boss portion 33a from the side of the male screw portion 71, and is further inserted together with a drive-side cam 29a through a center hole 73b in the driven-side cam 30a of the cam apparatus 31a, through a long hole 23 in the up-down direction that is formed in one support-plate portion 15c, through a long hole 27 in the forward-backward direction that is formed in a supported-plate portion 26, and through a long hole 23 in the up-down direction that is formed in the other support-plate portion 15b (see FIG. 2), and the male screw portion 71 protrudes out from the outside surface of the other support-plate portion 15b. In this state, the head portion 70 and the concave engaging portion 72 engage, combining the adjustment rod 24a and adjustment lever 32a so as to synchronously rotate. By screwing a nut (not illustrated) onto this male screw portion 71, an anchor portion is formed. A method for preventing the nut from coming loose such as a lock pin, crimping or the like is used between the male screw portion 71 and the nut. Moreover, a thrust bearing such as a thrust washer is provided between the inside surface for the nut and the outside surface of the other support-plate portion 15b, making it possible to reduce the force required for relative rotation between the nut and the support-plate portion 15b.

The driven-side cam 30a engages in the long hole 23 in the up-down direction that is formed in the one support-plate portion 15c so as to only be able to displace along the long hole 23 in the up-down direction. In order for this, a convex engaging portion 74 that is long in the up-down direction is formed on the inside surface of the driven-side cam 30a, and this convex engaging portion 74 engages in the long hole 23 in the up-down direction. Moreover, in this state, a drive-side cam surface 75 that is provided on the inside surface of the drive-side cam 29a engages with a driven-side cam surface 76 that is provided on the outside surface of the driven-side cam 30a. Both the drive-side cam surface 75 and the driven-side cam surface 76 are formed having convex portions and concave portions that are alternately arranged in the circumferential direction and that are continuous by way of inclined surfaces. According to rotation of the adjustment lever 32a, the space between the driven-side cam 30a, which corresponds to a pressing portion, and the nut of the anchor portion can expand or contract.

In this example as well, the expandable damper 35e has a cylinder portion 38, a damper rod 39 and grease 40. However, in this example, the expandable damper 35e, which functions as a resistance against the direction that the overall length is expanded or contracted, spans between the drive-side cam 29a, which is a portion rotates together with the adjustment lever 32a centered around the adjustment rod 24a, and the driven-side cam 30a, which is a portion that is fastened to the other support-plate portion 15c. In order for this, a protrusion 34a is integrally provided on the outer circumferential surface of the drive-side cam 29a, and a connecting hole 36a is provided in the tip-end portion of the protrusion 34a. On the other hand, a support-arm portion 77 is integrally provided with the driven-side cam 30a, and a second connecting hole 78 is provided in the tip-end portion of this support arm portion 77. The tip end half of the support arm portion 77 is offset toward the drive-cam 29a side with respect to the base end half, and the position relationship of the support portions on both ends of the expandable damper 35e in the axial direction of the adjustment rod 24a is properly regulated.

The expandable damper 35e is such that a tip-end-side flange 42a that is provided on the tip-end portion of the damper rod 39 is connected to the connecting hole 36a on the tip end of the protrusion 34a by a connecting screw 79a, and a base-end-side flange 45a that is provided on the base-end portion of the cylinder portion 38 is connected to the second connecting hole 78 in the tip end of the support arm portion 77 by a connecting screw 79b so as to be able to pivotally displace. The tip-end-side flange 42a and the base-end-side flange 45a are respectively connected to the first connecting hole 36a and second connecting hole 78, and make possible pivotal displacement of these flanges centered around the connecting holes 36a, 78, and a little pivotal displacement in the axial direction of the adjustment rod 24a (enough displacement to be able to absorb change in the dimensions in the axial direction of the cam apparatus 31a). In this way, when the expandable damper 35e spans between the tip end of the protrusion 34a and the tip end of the support arm portion 77, the cylinder portion 38 is located on the bottom side of the damper rod 39 with the opening facing upward.

In the case of the steering wheel position adjusting apparatus of this example, expansion and contraction of the expandable damper 35e occurs when the adjustment lever 32a is rotated between the positions illustrated in FIG. 25A(a) and FIG. 25A(b), or between the positions illustrated in FIG. 25B(a) and FIG. 25B(b). On the other hand, when the steering column 6a is pivotally displaced between the positions illustrated in FIG. 25A(a) and FIG. 25B(a) in order to adjust the height position of the steering wheel 1, the expandable damper 35e does not expand or contract. Therefore, the expandable damper 35e does not provide resistance against the adjustment of the height position of the steering wheel 1, and it is possible to more smoothly perform this height position adjustment.

Moreover, in the construction of this example, of the cylinder portion 38 and the damper rod 39 of the expandable damper 35e, the cylindrical shaped cylinder portion 38 that is open on the tip end is arranged on the bottom side, and regardless of the position of the steering column 6a or adjustment lever 32a, the cylinder portion 38 is greatly inclined as is in the up-down direction. Therefore, it is difficult for grease 40 that is located between the inner circumferential surface of the cylinder portion 38 and the outer circumferential surface of the damper rod 39 to leak out to the outside. Therefore, a sufficient amount of grease 40 is maintained between the inner circumferential surface of the cylinder portion 38 and the outer circumferential surface of the damper rod 39 over a long period of time, and thus the effect of preventing an unpleasant feeling from being given to the driver who operates the adjustment lever 32a can be maintained over a longer period of time.

Eventh Example

FIG. 26 to FIG. 29 illustrate a seventh example of an embodiment of the present invention. A feature of this example is that the construction of the expandable damper 35f that is applied to the position adjustment apparatus for the steering wheel 1 of the first through sixth examples of an embodiment of the present invention is devised. The construction other than that of this feature is the same as the construction of the first through sixth examples of an embodiment of the present invention.

Rod-shaped connecting portions 80a, 80b are provided on the base-end portion of the cylinder portion 38 of the expandable damper 35f and the tip-end portion of the damper rod 39. The cylinder portion 38 is integrally formed together with the rod-shaped connecting portion 80a, and the damper rod 39 is integrally formed together with the rod-shaped connecting portion 80b by injection molding of a high function resin having the required strength, rigidity, and oil resistance, or by die-cast molding using a light metal alloy such as an aluminum alloy, or by a shaving process of an iron-based alloy such as stainless steel.

The rod-shaped connecting portions 80a, 80b have a large-diameter portion 81a (81b) and a plurality of elastic leg pieces 82a (82b) each that are separated from each other in the circumferential direction. The large-diameter portion 81a (81b) forms the base end half of the rod-shaped connecting portion 80a (80b), and the elastic leg pieces 82a (82b) are such that the base-end portions of the elastic leg pieces 82a (82b) are continuous with the middle portion in the radial direction of the tip-end surface 83a (83b) of the large-diameter portion 81a (81b), and protrude out from this tip-end surface 83a (83b). These elastic leg pieces 82a (82b) are inclined with respect to the center axis of the rod-shaped connecting portion 80a (80b) such that the closer to the tip-end portions of the elastic leg pieces 82 (82b), or in other words, the further away from the tip-end surface 83a (83b) of the large-diameter portion 81a (81b), the spacing between each becomes wider. Furthermore, a hook-shaped locking portion 84a (84b) that protrude outward in the radial direction are formed on the tip-end portions of the elastic leg pieces 82a (82b) on the side surfaces on the radially outward sides in the radial direction of the rod-shaped connecting portion 80a (80b). The outer circumferential surfaces on the tip end half of these locking portions 84a (84b) are inclined in a direction toward the inside in the radial direction of the rod-shaped connecting portions 80a (80b) toward the tip-end surface of the elastic leg pieces 82a (82b), and form inclined guide surfaces 85a (85b). The number of elastic leg pieces 82a (82b) is not limited to four, and it is possible to use two or three, or even five or more.

The base-end portion of a thin elastic portion 86a (86b), which is an elastic member, is continuous with the outer circumferential edge portion of the tip-end surface 83a (83b) of the large-diameter portion 81a (81b). The thin elastic portion 86a (86b) has a partial cylindrical cone shape that is inclined in a direction such that the diameter increases going toward the tip-end edge, or in other words, going away from the tip-end surface 83a (83b).

On the other hand, a circular connecting hole 88 is formed in a connecting plate portion 87, which is a plate-shaped portion for connecting both end portions of the expandable damper 35f. This connecting plate portion 87 corresponds to the protrusion 34 or extending portion 37 of the first example of an embodiment, or corresponds to the protrusion 34a or support arm portion 77 of the sixth example of an embodiment. The inner diameter R of the connecting hole 88 is suitably regulated by the relationship with the outer diameter of the rod-shaped connecting portion 80a (80b), and is such that the rod-shaped connecting portion 80a (80b) can be easily pushed into this connecting hole 88, and so that after being pushed in, the rod-shaped connecting portion 80a (80b) will not come out from the connecting hole 88. Specifically, the sizes of the elastic leg pieces 82a (82b) and the connecting hole 88 are regulated such that in the free state of the elastic leg piece 82a (82b), the diameter of the circumscribed circle of the locking portions 84a (84b) is greater than the inner diameter R of the connecting hole 88, and such that in the elastically deformed state in which the elastic leg pieces 82a (82b) are elastically deformed toward each other, the diameter of the circumscribed circle of the locking portions 84a (84b) is equal to or less than the inner diameter R of the connecting hole 88. Moreover, even in the free state of the elastic leg pieces 82a (82b), the diameter of the circumscribed circle of the tip-end portion (minimum-diameter portion) of the inclined guide surface 85a (85b) is smaller than the inner diameter R of the connecting hole 88.

The thickness of the connecting plate portion 87 is suitably regulated by the relationship with the spacing between the locking portions 84a (84b) and the large-diameter portion 81a (81b), and the dimension in the axial direction of the thin elastic portion 86a (86b), and is such that the rod-shaped connecting portion 80a (80b) is connected in the connecting hole 88 with no looseness, and so that pivotal displacement in a direction so that there is relative displacement of the center axes of each is possible. Specifically, the thickness of the connecting plate portion 87 is less than the spacing between the base-end surfaces 89a (89b) of the locking portions 84a (84b) and the tip-end surface 83 (83b) of the large-diameter portion 81a (81b). Moreover, the difference between this spacing and the thickness of the connecting plate portion 87 is made to be less than the dimension in the axial direction of the thin elastic portion 86a (86b) in the free state. In the case of this example, in the free state of the elastic leg pieces 82a (82b), the diameter of the circumscribed circle of these elastic leg pieces 82a (82b) becomes a maximum value D on the tip-end portion of the elastic leg pieces 82a (82b). The maximum value D of the diameter is greater than the inner diameter R of the connecting hole 68 (D>R).

In order to connect the rod-shaped connecting portion 80a (80b) in the connecting hole 88 of the connecting plate portion 87, as illustrated in FIG. 29A, the connecting hole 88 and the rod-shaped connecting portion 80a (80b) are arranged so as to be on nearly the same axial line, and then from this state, the locking portions 84a (84b) are pushed into the connecting hole 88. As a result, these locking portions 84a (84b) pass through the connecting hole 88 while the elastic leg pieces 82a (82b) elastically deform in a direction toward each other. After passing through the hole, the elastic leg pieces 82a (82b) are elastically restored, and as illustrated in FIG. 29B, the base-end surfaces 89a (89b) of the locking portions 84a (84b) engage with the circumferential edge portion of the connecting hole 88 on one surface of the connecting plate portion 87 (upper surface in FIG. 29A, 29B). In this state, there is a space between the tip-end surface 83a (83b) of the large-diameter portion 81a (81b) and the other surface of the connecting plate portion 87 (bottom surface in FIGS. 29A, 29B). Furthermore, the tip-end edge portion of the thin elastic portion 86a (86b) is pressed against the other surface of the connecting plate portion 87, and the dimension in the axial direction of the thin elastic portion 86a (86b) is elastically compressed. Then the outer circumferential surfaces of the tip-end portions of the elastic leg pieces 82a (82b) are elastically pressed against the inner circumferential surface of the connecting hole 88.

With the construction of this example, both end portions of the expandable damper 35f and the connecting plate portion 87 of the opposing member can be easily connected such that relative displacement in the axial of the adjustment rod 24, 24a can be absorbed, and so that there is no looseness when traveling over bad conditioned roads. In other words, the work of connecting both end portions of the expandable damper 35f and the connecting plate portion 87 is performed by simply pressing the plurality of elastic leg pieces 82a (82b) of the rod-shaped connecting portion 80a (80b) into the connecting hole 88. In the connected state, the thin elastic portion 86a (86b) is elastically stretched between the tip-end surface 83a (83b) of the large-diameter portion 81a (81b) and the connecting plate portion 87, while at the same time, the outer circumferential surfaces of the tip end portions of the elastic leg pieces 82a (82b) are elastically pressed against the inner circumferential surface of the connecting hole 88. As a result, both end portions of the expandable damper 35f and the connecting plate portion 87 are able to rotate around the connecting rod-shape portion 80a (80b), and pivotally displace in a direction that causes the rod-shaped connecting portion 80a (80b) to incline, and this connection has no looseness. The thin elastic portion 86a (86b) is integrally provided with the cylinder portion 38 or damper rod 39 of the expandable damper 35f, so there is no need for a separate elastic member, so managing parts and assembly work is simplified.

Eighth Example

Figure 30:
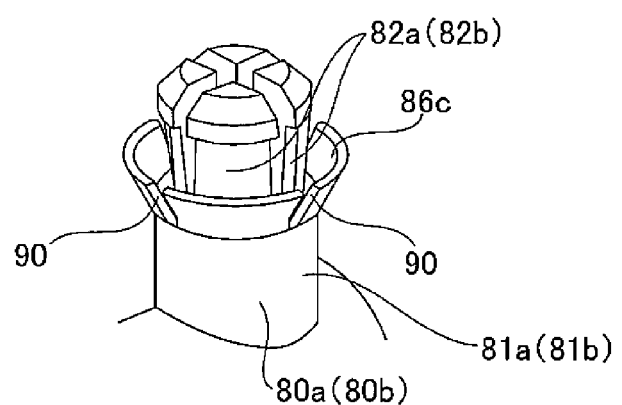
FIG. 30 is a perspective view that corresponds to the upper right portion in FIG. 27 of an expandable damper of an eighth example of an embodiment of the present invention.

FIG. 30 illustrates an eighth example of an embodiment of the present invention. In this example, a plurality of cuts 90 are formed at a plurality of locations in the circumferential direction of the thin elastic portion 86c, and each cut reaches the tip-end edge of the thin elastic portion 86c. When compared with the case in the seventh example of an embodiment, the elasticity of the thin elastic portion 86c is kept low. The construction and functions of the other parts are the same as in the seventh example of an embodiment.

Ninth Example

Figure 31:
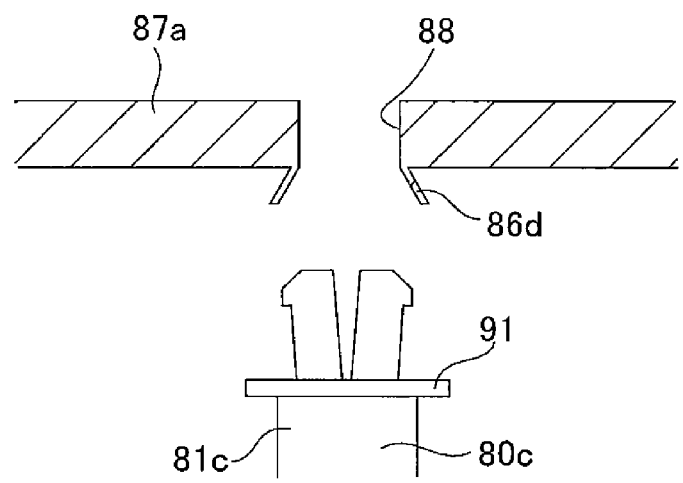
FIG. 31A and FIG. 31B are views that correspond to FIG. 29A and FIG. 29B of a ninth example of an embodiment of the present invention.
Figure 31:
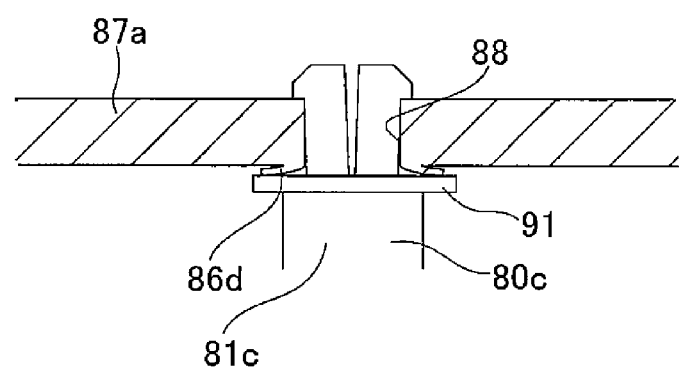

FIG. 31A and FIG. 31B illustrate a ninth example of an embodiment of the present invention. In this example, instead of not providing thin elastic portions 86a, 86b, 86c on the tip-end portion of the large-diameter portion 81c that constitute the base-end half of the rod-shaped connecting portion 80c, an outward facing flange portion 91 is provided. On the other hand, a thin elastic portion 86d that is integrated with the connecting plate portion 87a is provided around the circumferential edge portion of the connecting hole 88 in the connecting plate portion 87a. In order for this, the connecting plate portion 87a and the thin elastic portion 86d are integrally formed using an elastic material such as a synthetic resin. Moreover, the thin elastic portion 86d is inclined in a direction such that the diameter increases going away from the connecting plate portion 87a to form a partial cylindrical cone shape. In the assembled state, the tip-end edge of the thin elastic portion 86d comes in elastic contact with the flange portion 91. The construction and functions of the other parts are the same as in the seventh and eighth examples of an embodiment.

Tenth Example

Figure 32:
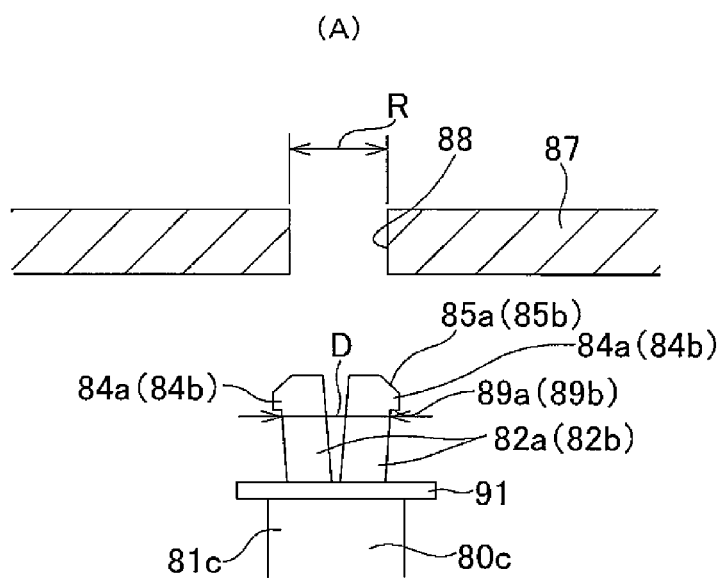
FIG. 32A and FIG. 32B are views that correspond to FIG. 29A and FIG. 29B of a tenth example of an embodiment of the present invention.
Figure 32:
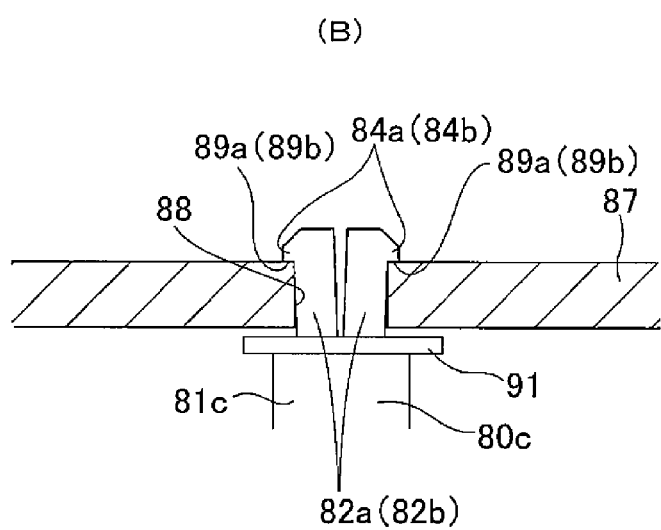
Figure 33:
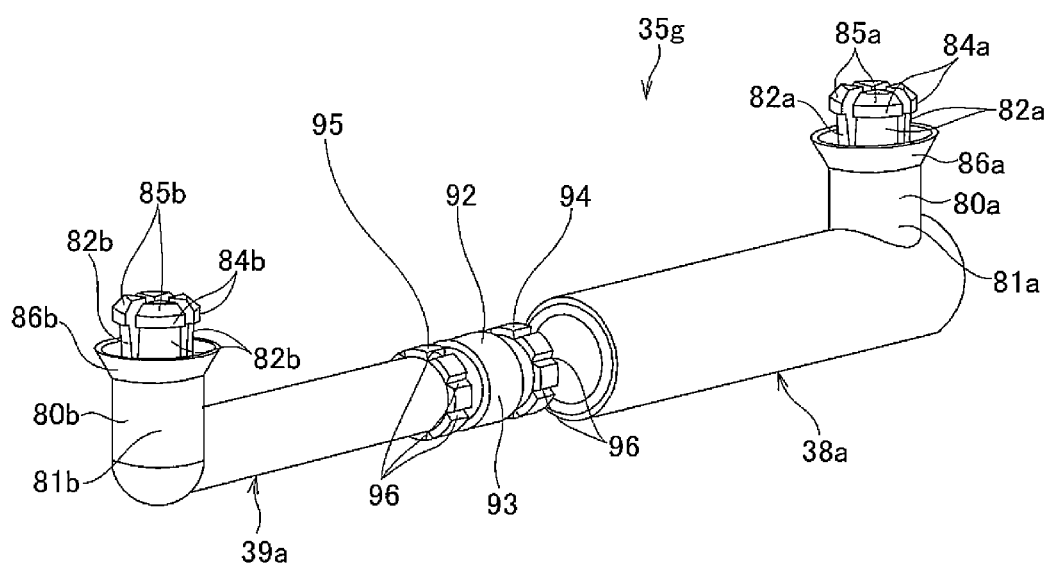
FIG. 33 is a perspective view illustrating the state before assembly of an expandable damper of an eleventh example of an embodiment of the present invention.
Figure 34:
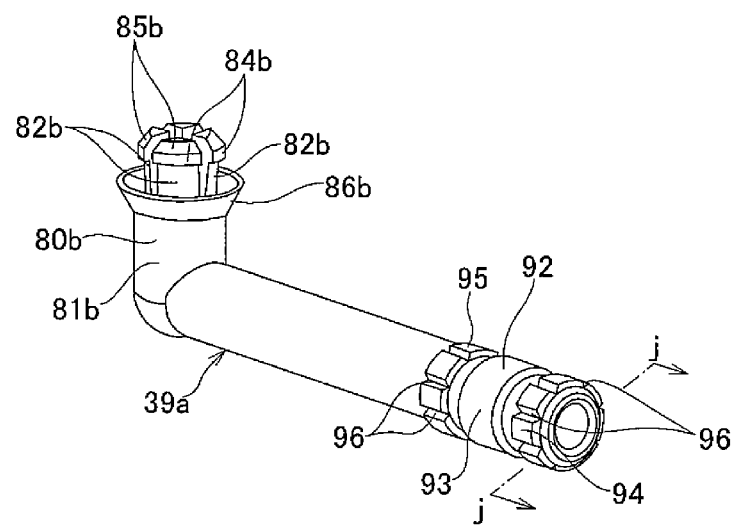
FIG. 34 is a perspective view as seen from the opposite direction as in FIG. 33, illustrating a damper rod that has been removed from the expandable damper that is illustrated in FIG. 33.
Figure 35:
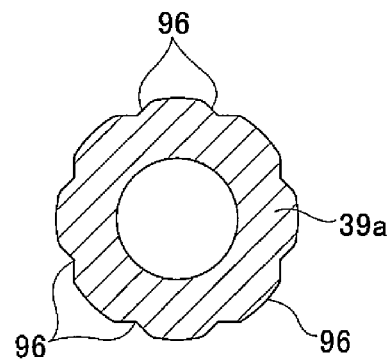
FIG. 35 is a cross-sectional view of section j-j in FIG. 34.
Figure 36:
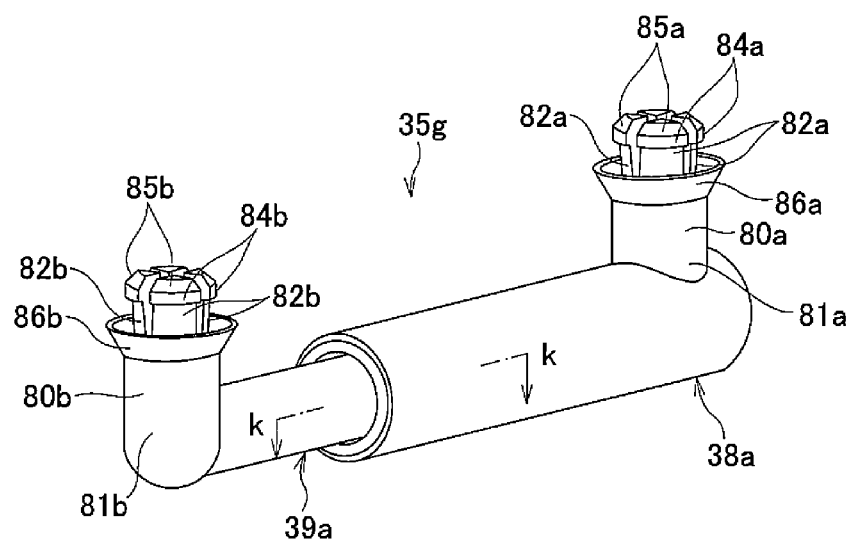
FIG. 36 is a perspective view as seen from the same direction as in FIG. 33, illustrating an assembled state of the expandable damper that is illustrated in FIG. 33.
Figure 37:
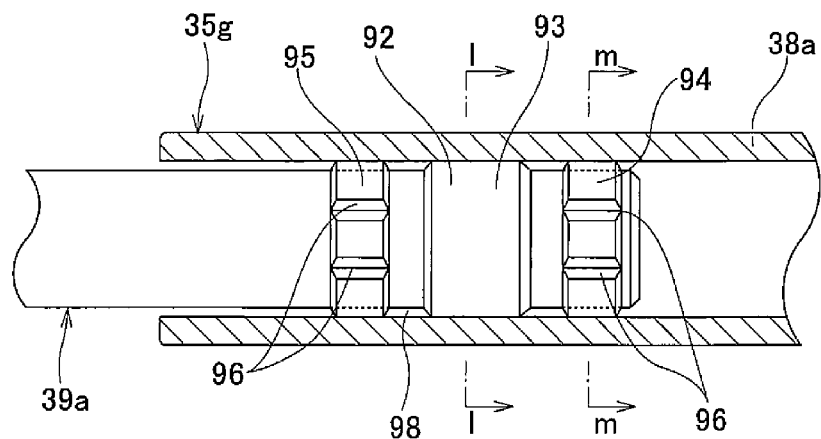
FIG. 37 is a cross-sectional view of section k-k in FIG. 36.
Figure 38:
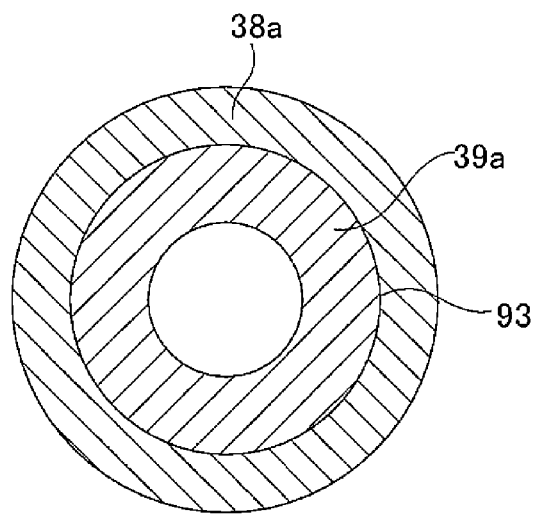
FIG. 38 is a cross-sectional view of section l-l in FIG. 37.

FIG. 32A and FIG. 32B illustrate a tenth example of an embodiment of the present invention. In the construction of this example, an outward-facing flange portion 91 is provided on the tip-end portion of the large-diameter portion 81c that constitutes the base-end half of the rod-shaped connecting portion 80c instead of thin elastic portions 86a, 86b, 86c. However, it is different from the ninth example of an embodiment that there is also no thin elastic portion 86d provided on the circumferential edge portion of the connecting hole 88 of the connecting plate portion 87a. Therefore, in this example, there is no elastic force that pushes the base-end surfaces 89a (89b) of the locking portions 84a (84b) against the circumferential edge portion of the opening of the connecting hole 88. However, even in the construction of this example, in the free state of the elastic leg pieces 82a (82b), with the rod-shaped connecting portion 80c connected with the connecting plate portion 87, the maximum value D of the diameter of the circumscribed circle of the portions of the elastic leg pieces 82a (82b) that are inside the connecting hole 88 (portions except the locking portions 84a (84b)) is greater than the inner diameter R of the connecting hole 88 (D>R). Therefore, in a state in which the rod-shaped connecting portion 80c and the connecting plate portion 87 are connected, the outer circumferential surfaces on the tip-end portions of the elastic leg pieces 82a (82b) are elastically pressed against the inner circumferential surface of the connecting hole 88. Therefore, in the case of this example as well, the end portions of the expandable damper 35f can be connected with no looseness to a connecting plate portion 87 so as to be able to rotate centered around the rod-shaped connecting portion 80c, and so that a little displacement in the axial direction of the rod-shaped connecting portion 80c is possible. The construction and functions of the other parts are the same as in the ninth example of an embodiment.

Eleventh Example

FIG. 33 to FIG. 39 illustrate an eleventh example of an embodiment of the present invention. A feature of this example is the construction of the damper rod 39a of the expandable damper 35g. In other words, the shape of the insert portion 92 of the portion near the base end of the damper rod 39a, which is the portion that, when inserted inside the cylinder portion 38a, moves back-and-forth in the axial direction inside the cylinder portion 38a, is devised. This insert portion 92 is constructed so as to lessen the offset of grease 40 due to back-and-forth movement of the damper rod 39a. Specifically, the insert portion 92 has a middle large-diameter portion 93, a large-diameter portion 94 near the base end, and a large-diameter portion 95 near the center, that are formed so as to be spaced apart from each other in the axial direction.

The middle large-diameter portion 93, the large-diameter portion 94 near the base end, and the large-diameter portion 95 near the center are all a little smaller than the inner diameter of the cylinder portion 38a, and these large-diameter portions 93, 94, 95 can be inserted inside the cylinder portion 38a so as to be able to displace in the axial direction. The outer circumferential surface of the middle large-diameter portion 93 is a simple cylindrical surface. Therefore, the outer circumferential surface of the middle large-diameter portion 93 closely faces the inner circumferential surface of the cylinder portion 38a through a minute space. The thickness of this minute space becomes a large resistance to the flow of grease 40, and so the grease 40 is essentially prevented from moving between the both sides in the axial direction of the middle large-diameter portion 93.

Figure 39:
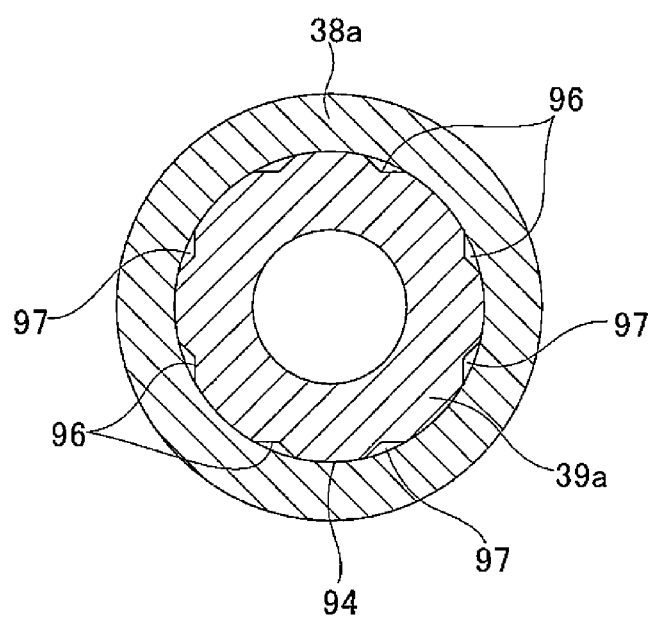
FIG. 39 is a cross-sectional view of section m-m in FIG. 37.

On the other hand, the large-diameter portion 94 near the base end and the large-diameter portion 95 near the center that are formed at positions on both sides in the axial direction of the middle large-diameter portion 93 have concave groove portions 96 that are formed at a plurality of locations (eight locations in the illustrated example) on the outer circumferential surfaces of these large-diameter portions 94, 95 that are evenly spaced in the circumferential direction and cut across the portions in the axial direction. Therefore, the space between the outer circumferential surface of the large-diameter portion 94 near the base end and the outer circumferential surface of the large-diameter portion 95 near the center and the inner circumferential surface of the cylinder portion 38a becomes wider in parts in the circumferential direction. In other words, the portions surrounded by the inner circumferential surface of the cylinder portion 38a and the concave grooves 96, as illustrated in FIG. 39, become restricting flow paths 97 having a small cross-sectional area. On the other hand, the width in the radial direction of the portions in the space between the outer circumferential surface of the large-diameter portion 94 near the base end and the outer circumferential surface of the large-diameter portion 95 near the center and the inner circumferential surface of the cylinder portion 38a that is separated from the restricting flow paths 97 becomes very narrow like the space between the inner circumferential surface of the cylinder portion 38a and the outer circumferential surface of the middle large-diameter portion 93. With this kind of construction, the outer circumferential surfaces of the middle large-diameter portion 93, the large-diameter portion 94 near the base end, and the large-diameter portion 95 near the center face the inner circumferential surface in at least part in the circumferential direction of the cylinder portion 38a through a minute space, so the bending rigidity of the expandable damper 35g is maintained.

The shapes of the outer circumferential surfaces of the middle large-diameter portion 93, the larger-diameter portion 94 near the base end, and the large-diameter portion 95 near the center differ as described above, so the resistance against the flow of grease 40 in the portions of the cylindrical space 98 between the outer circumferential surface of the insert portion 92 and the inner circumferential surface of the cylinder portion 38a differs in the axial direction. Specifically, the resistance in the minute space that exists between the outer circumferential surface of the middle large-diameter portion 93 and the inner circumferential surface of the cylinder portion 38a becomes large. Therefore, the grease inside the portion of the cylindrical space 98 mostly does not flow in the axial direction through this minute space (mostly does not pass the middle large diameter portion 93).

However, there are restricting flow paths 97 between the outer circumferential surface of the large-diameter portion 94 near the base end and the outer circumferential surface of the large-diameter portion 95 near the center and the inner circumferential surface of the cylinder portion 38a. Therefore, when there is relative displacement in the axial direction between the cylinder portion 38a and the damper rod 39a, the grease 40 flows through the restricting flow paths 97 between the spaces that exist on both sides in the axial direction of the large-diameter portion 94 near the base end and the large-diameter portion 95 near the center. In this case, as the grease flows through the limited restricting flow paths 97, there is resistance to the expansion or contraction of the expandable damper 35g. Therefore, resistance against the rotation of the adjustment lever 32, 32a can be applied. As long as the groove portions that form the restricting flow paths 97 cut in the axial direction across the outer circumferential surface of the large-diameter portion 94 near the base end and the outer circumferential surface of the large-diameter portion 95 near the center, the grooves can also be inclined in the axial direction. For example, various shapes can be used such as crossing grooves like roulette grooves, or inclined grooves such as helical spline grooves, as long as the bending rigidity of the expandable damper 35g is maintained, and a little grease is allowed to flow between both sides in the axial direction of the large-diameter portion 94 near the base end and the large-diameter portion 95 near the center.

In the case of the steering wheel position adjusting apparatus of this example that uses this kind of expandable damper 35g, even after repeated use, a reduction in the effect of preventing rotation of the adjustment lever 32, 32a with much energy can be suppressed. In other words, even grease 40 that is between the inner circumferential surface of the cylinder portion 38a and the outer circumferential surface of the damper rod 39a flows through the restricting flow paths 97 between both sides in the axial direction of the large-diameter portion 94 near the base end and the large-diameter portion 95 near the center when the expandable damper 35g expands or contracts, there is hardly any flow between both sides in the axial direction of the middle large-diameter portion 93. Therefore, even after that expandable damper 35g has been expanded or contracted repeatedly, nearly the same amount of grease 40 as in the initial state exists on both sides in the axial direction of the middle large-diameter portion 93, so it is possible to maintain the effect of preventing energetic rotation of adjustment lever 32, 32a.

In this example, the damper rod 39a is a hollow tube having a center hole that is open only on the base-end surface of the damper rod 39a. Together with being able to maintain the amount of grease 40 that can be filled into the space between the base-end portion of the damper rod 39a and the back portion of the cylinder portion 38a, it is also possible to suppress fluctuation in the pressure at the back portion of the cylinder portion 38a and maintain the damper performance of the expandable damper 35g over a longer period of time. The construction and functions of the other parts are the same as in the seventh to tenth examples of an embodiment.

Twelfth Example

Figure 40:
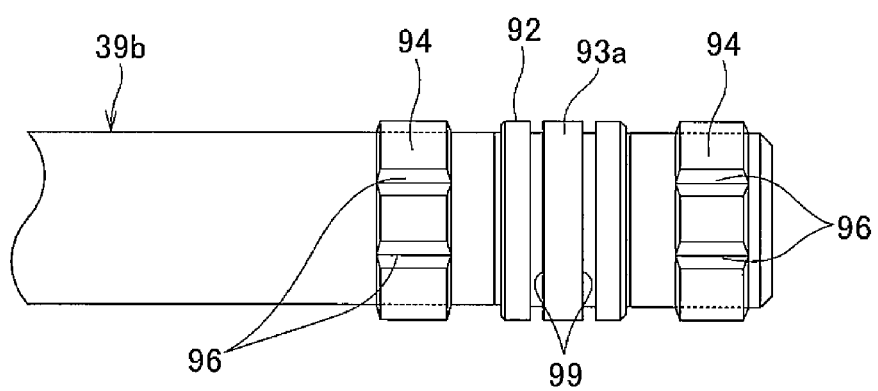
FIG. 40 is a side view of the base-end portion of a damper rod of a twelfth example of an embodiment of the present invention.
Figure 41:
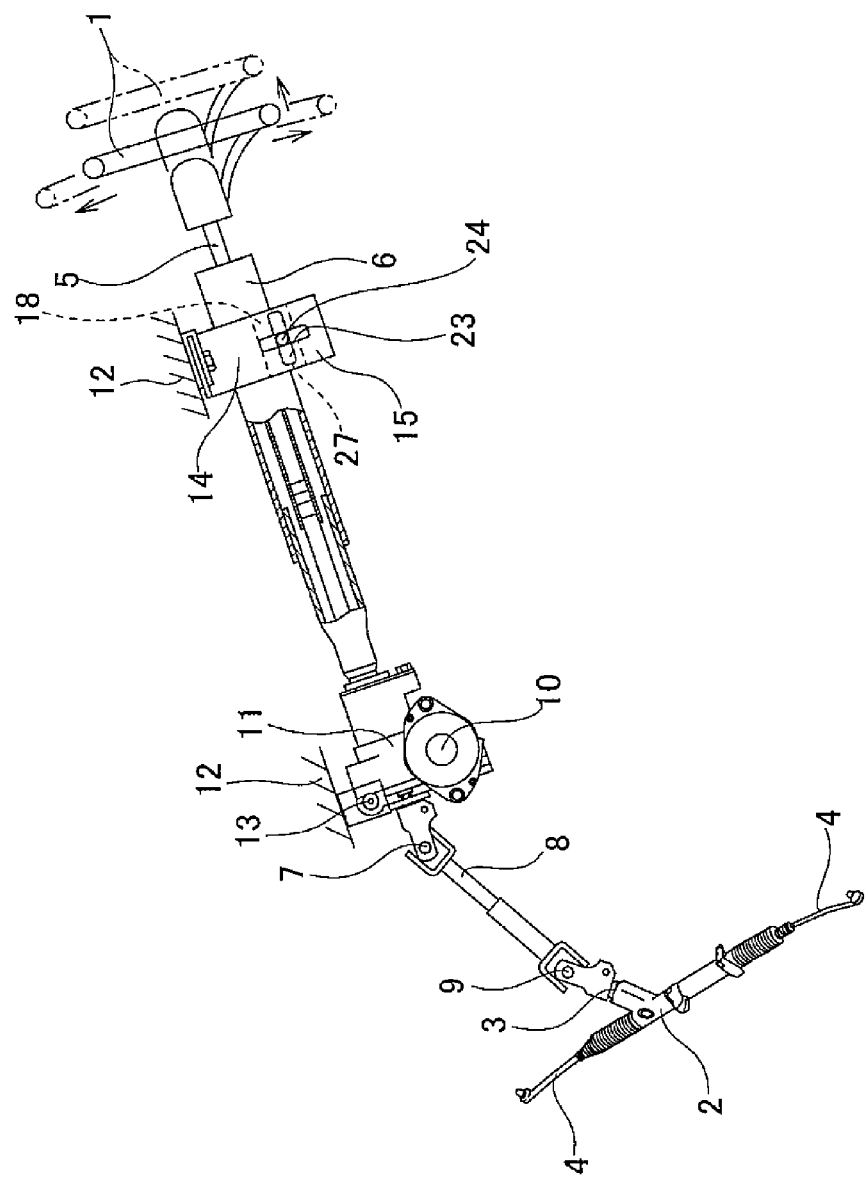
FIG. 41 is a side view illustrating an example of a conventional steering apparatus for an automobile.
Figure 42:
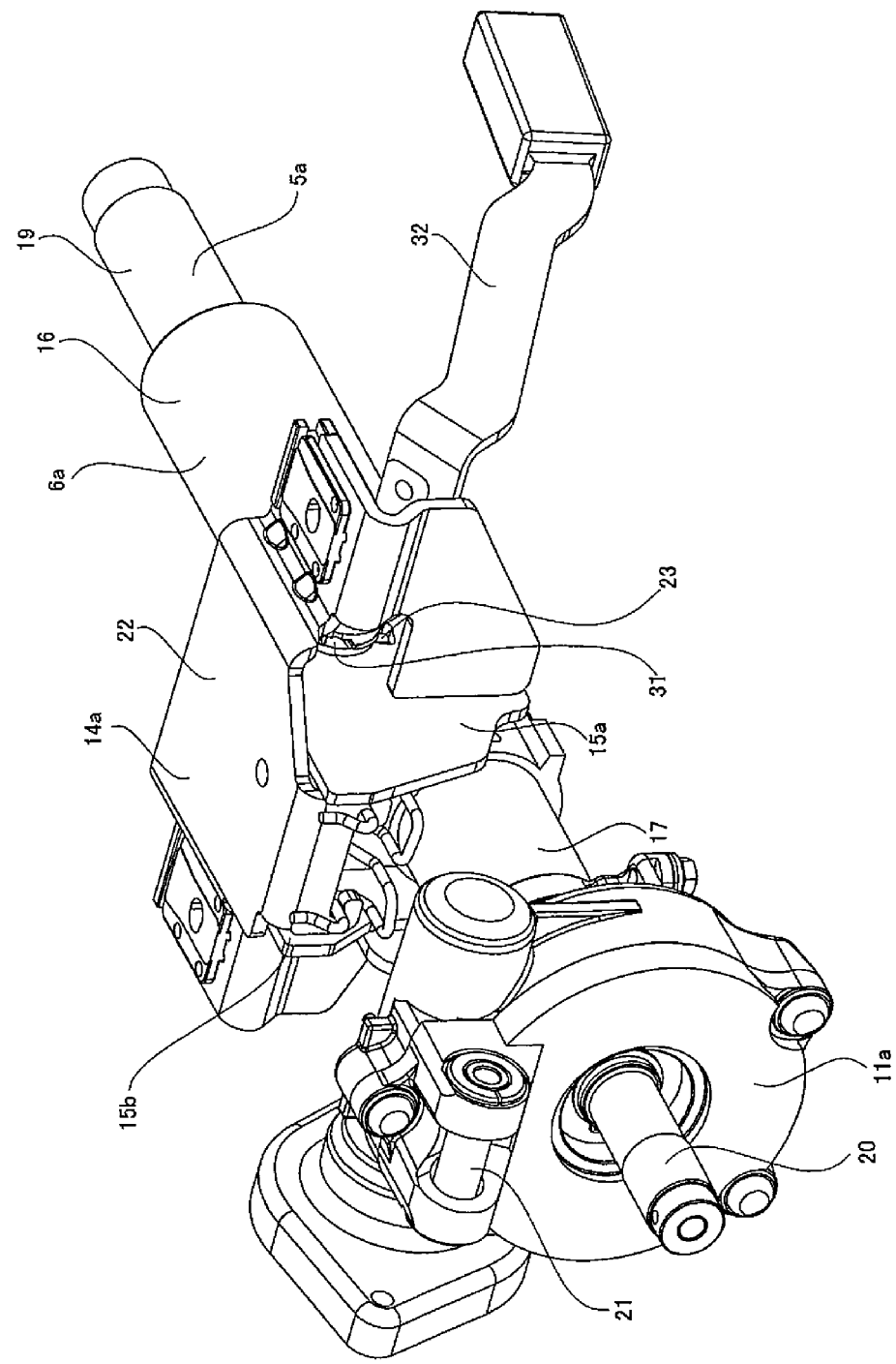
FIG. 42 is a perspective view of an example of a conventional steering wheel position adjusting apparatus as seen from the front above.
Figure 43:
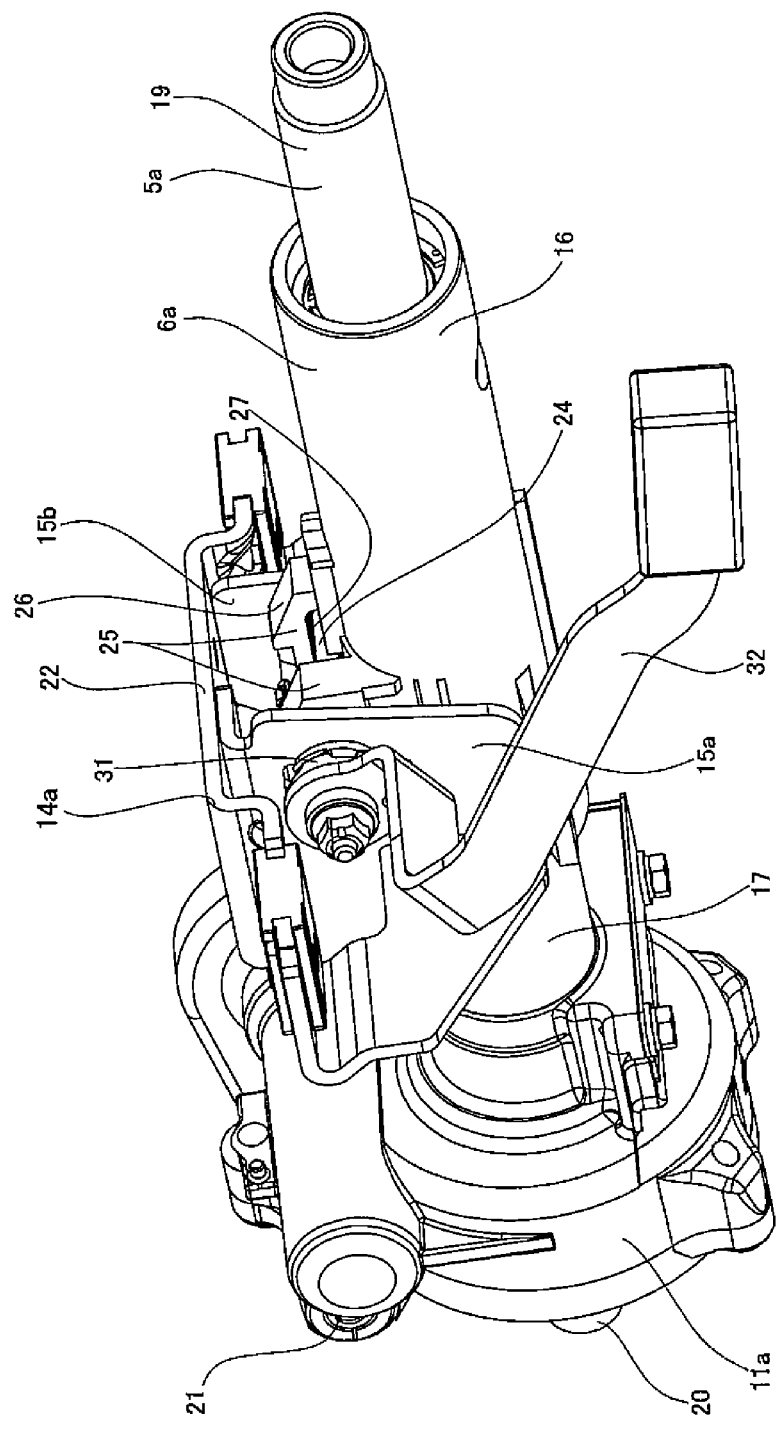
FIG. 43 is a perspective view of the example illustrated in FIG. 42 as seen from below in the rear.
Figure 44:
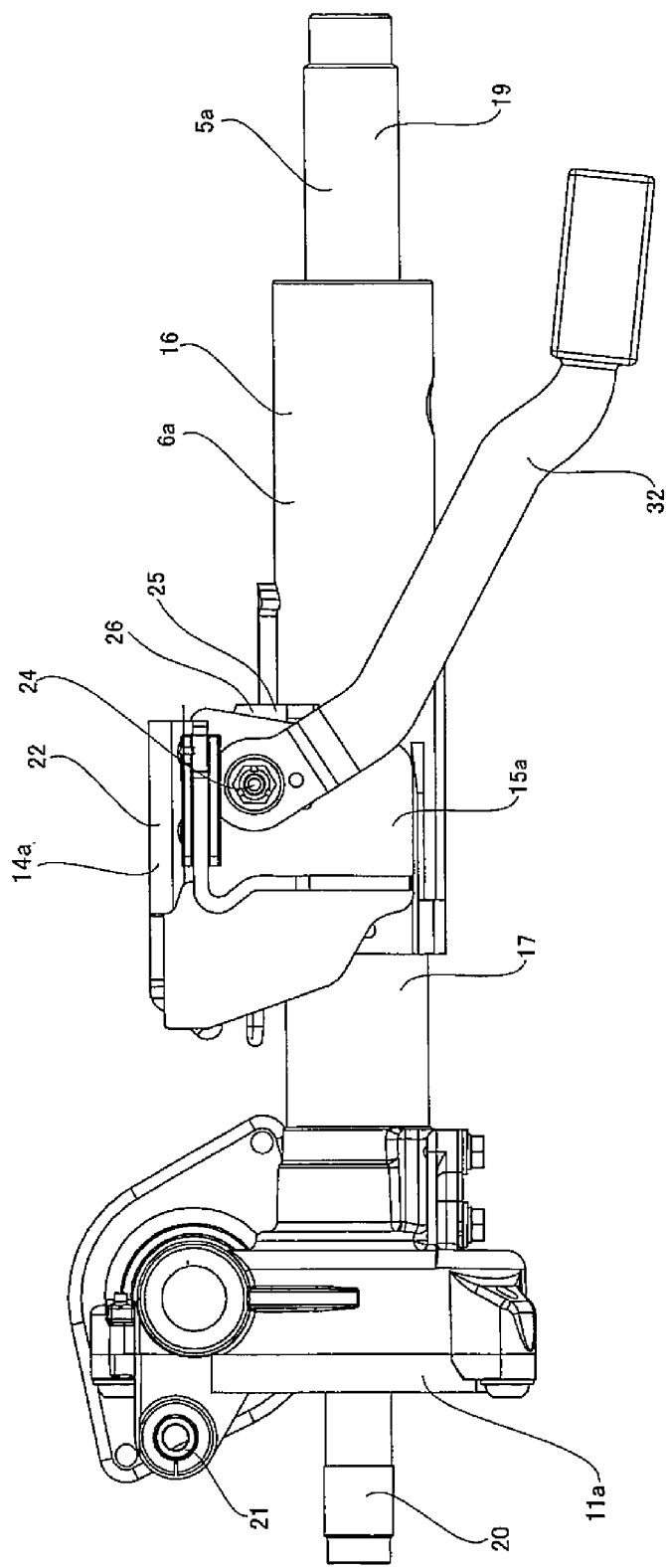
FIG. 44 is a side view of the example illustrated in FIG. 42 as seen from the left side.

FIG. 40 illustrates a twelfth example of an embodiment of the present invention. In this example, concave portions 99 in the circumferential direction are formed around the entire circumference of the middle large-diameter portion 93a at two locations separated in the axial direction on the outer circumferential surface of the middle portion in the axial direction of the middle large-diameter portion 93a that is formed in the portion near the base end of the outer circumferential surface of the damper rod 39b. With the damper rod 39b inserted in the cylinder portion 38a, the space between the outer circumferential surface of the middle large-diameter portion 93a and the inner circumferential surface of the cylinder portion 38a functions as a labyrinth seal. With the construction of this example, the amount of grease that flows between both sides in the axial direction of the middle large-diameter portion 93a can be kept even smaller. The construction and functions of the other parts are the same as in the eleventh example of an embodiment.

INDUSTRIAL APPLICABILITY

The steering wheel position adjusting apparatus of the present invention can be applied to a steering apparatus that has a tilt and telescopic function, however, can also be applied to a steering apparatus that has only a tilt function, or can be applied to a steering apparatus that has only a telescopic function.

EXPLANATION OF REFERENCE NUMBERS

1 Steering wheel
2 Steering gear unit
3 Input shaft
4 Tie rod
5, 5a Steering shaft
6, 6a Steering column
7 Universal joint
8 Intermediate shaft
9 Universal joint
10, 10a Electric motor
11, 11a Housing
12 Vehicle body
13 Tilt shaft
14, 14a, 14b Support bracket
15, 15a, 15b, 15c Support-plate portion
16 Outer column
17 Inner column
18 Displacement bracket
19 Outer shaft
20 Inner shaft
21 Support tube
22 Installation plate portion
23 Long hole in the up-down direction
24, 24a Adjustment rod
25 Supported-wall portion
26 Supported portion
27 Long hole in the forward-backward direction (displacement-side through hole)
28 Flange portion
29, 29a Drive-side cam
30, 30a Driven-side cam
31, 31a Cam apparatus
32, 32a Adjustment lever
33, 33a Boss portion
34, 34a Protrusion
35, 35a to 35g Expandable damper
36, 36a Connecting hole
37 Extending portion
38, 38a Cylinder portion
39, 39a, 39b Damper rod
40 Grease
41 Space
42, 42a Tip-end-side flange portion
43, 43a, 43b Insert though hole
44, 44a, 44b Elastic leg piece
45, 45a Base-end-side flange portion
46a to 46g Airflow path
47a, 47b Cover
48 Space
49, 49a, 49b, 49c First sliding member
50, 50a, 50b, 50c Second sliding member
51, 51a Radially outward cylinder portion
52, 52a Radially inward sliding portion
53 First installation portion
54, 54a First bottom plate portion
55a, 55b, 55c, 55d Installation ring portion
56a, 56b Screw
57, 57a Radially inward cylinder portion
58 Second installation portion
59, 59a Second bottom plate portion
60 Center hole
61 Center sliding portion
62, 62a Cylinder portion
63 First installation portion
64 Bottom plate portion
65, 65a Small-diameter portion
66a, 66b Large-diameter portion
67, 67a Piston portion
68 Second installation portion
69 Concave portion
70 Head portion
71 Male screw portion
72 Concave engaging portion
73a, 73b Center hole
74 Convex engaging portion
75 Drive-side cam surface
76 Driven-side cam surface
77 Support arm portion
78 Second connecting hole
79a, 79b Connecting screw
80a, 80b, 80c Rod-shaped connecting portion
81a, 81b, 81c Large-diameter portion
82a, 82b Elastic leg piece
83a, 83b Tip-end surface
84a, 84b Locking portion
85a, 85b Inclined guide surface
86a, 86b, 86c, 86d Thin elastic portion
87, 87a Connecting plate portion 88 Connecting hole
89a, 89b Base-end surface
90 Cut
91 Flange portion
92 Insert portion
93, 93a Middle large-diameter portion
94 Large-diameter portion near the base end
95 Large-diameter portion near the center
96 Concave groove
97 Restricting flow path
98 Cylindrical space
99 Concave groove in the circumferential direction

What is claimed is:

1. A steering wheel position adjusting apparatus, comprising:
   a steering column;
   a supported portion provided on part of the steering column;
   a displacement-side though hole provided in the supported portion;
   a steering shaft supporting a steering wheel on a rear-end portion of the steering shaft, the steering shaft being rotatably supported on a radially inward side of the steering column;
   a support bracket having a pair of support-plate portions that hold the supported portion from both sides in a width direction, and supported by a portion that is fastened to a vehicle body;
   a pair of fixed-side through holes provided in portions of the pair of support-plate portions that are aligned with each other;
   an adjustment rod inserted in the width direction through the pair of fixed-side though holes and the displacement-side through hole;
   an anchor portion provided on one end portion of the adjustment rod that protrudes out from an outside surface of one support-plate portion of the pair of support-plate portions;
   a pressing portion provided on other end portion of the adjustment rod that protrudes from an outside surface of other support-plate portion of the pair of support-plate portions;
   an expansion mechanism expanding or contracting a space between the pressing portion and the anchor portion;
   an adjustment lever operating the expansion mechanism according to rotation of the adjustment lever centered around the adjustment rod; and
   a damper provided between a portion that rotates together with the adjustment lever centered around the adjustment rod and a portion that is fixed to the other support plate portion, and providing resistance against at least a rotation of the adjustment lever in a direction toward a position that enables position adjustment of the steering wheel, and
   the pair of fixed-side through holes being constructed by a pair of long holes in a up-down direction that extend in the up-down direction to allow the steering wheel to be adjusted centered around a tilt shaft that is arranged in the width direction, wherein
   the damper is constructed by an expandable damper that provides resistance with respect to a direction of expansion or contraction of an overall length, and
   the damper comprises:
      a cylinder portion having a tip-end portion, a base-end portion and an opening that is open on the tip-end portion of the cylinder portion; and
      a damper rod having a tip-end portion, a middle portion and a base-end portion, the base-end portion to the middle portion of the damper being loosely inserted inside the cylinder portion from the opening on the tip-end portion of the cylinder portion, wherein
   the base-end portion of the cylinder portion is supported by one of the portion that rotates together with the adjustment lever centered around the adjustment rod, and the portion that is fixed to the other support-plate portion, and
   the tip-end portion of the damper rod is supported by the other of the portion that rotates together with the adjustment lever centered around the adjustment rod, and the portion that is fixed to the other support-plate portion,
   with the base-end portion of the cylinder portion and the tip-end portion of the damper rod being supported to be pivotally displaced respectively centered around a pivot shaft that is arranged in the width direction, and to absorb dimensional change in an axial dimension of the expansion mechanism, in an installation direction that an amount of change in a distance between the base-end portion of the cylinder portion and the tip-end portion of the damper rod is kept small when the steering column is pivotally displaced in order to displace the adjustment rod along the pair of long holes in the up-down direction.

2. The steering wheel position adjusting apparatus according to claim 1, wherein
   the expansion mechanism is constructed by a cam apparatus that is provided on a portion of the other end portion of the adjustment rod that protrudes from the outside surface of the other support-plate portion, and that expands or contracts a dimension in the axial direction of the cam apparatus based on engagement between a drive-side cam surface and a driven-side cam surface, and
   the drive-side cam surface and the driven-side cam surface are surfaces having convex portions and concave portions that are continuous by way of inclined surfaces, such that the dimension in the axial direction of the cam apparatus is expanded or contracted by the adjustment lever rotating the drive-side cam on which the drive-side cam surface is provided.

3. The steering wheel position adjusting apparatus according to claim 1, wherein
   the damper is an expandable damper that is formed by combining a first sliding member and a second sliding member that are able to slide in an axial direction, and that provides resistance with respect to a direction of expansion and contraction of an overall length of the damper;
   the first sliding member comprises:
      an radially outward cylinder portion having a cylindrical shape with a bottom;
      an radially inward sliding portion that is arranged concentric with the radially outward cylinder portion at a center portion of the radially outward cylinder portion, a base-end portion of the radially inward sliding portion being connected and fastened to a base-end portion of the radially outward cylinder portion; and
      a first installation portion that is connected and fastened to a base-end portion of the radially outward cylinder portion and the radially inward sliding portion, wherein
   the second sliding member comprises:
      an radially inward cylinder portion having a cylindrical shape with a bottom, the radially inward cylinder portion being inserted inside a cylindrical space that exists between an inner circumferential surface of the radially outward cylinder portion and an outer circumferential surface of the radially inward sliding portion; and a second installation portion that is connected and fastened to a base-end portion of the radially inward cylinder portion, wherein the first installation portion is supported by one of the portion that rotates together with the adjustment lever centered around the adjustment rod, and the portion that is fixed to the other support-plate portion, and the second installation portion is supported by the other one of the portion that rotates together with the adjustment lever centered around the adjustment rod, and the portion that is fixed to the other support-plate portion, with the first installation portion and the second installation portion being supported to be pivotally displaced respectively centered around a pivot shaft that is arranged in the width direction, and to absorb dimensional change in the axial dimension of the expansion mechanism.

4. The steering wheel position adjusting apparatus according to claim 1, wherein the damper is an expandable damper that is formed by combining a first sliding member and a second sliding member that are able to slide in an axial direction, and the damper providing resistance with respect to a direction of expansion and contraction of an overall length of the damper, the first sliding member comprises:
a cylinder portion having a cylindrical shape with a bottom; and
a first installation portion that is connected and fastened to a base-end portion of the cylinder portion, and the second sliding member comprises:
a piston portion that is inserted into the cylinder portion; and
a second installation portion that is connected and fastened to a base-end portion of the piston portion, wherein a concave portion that is more recessed than an adjacent portion of the concave portion is provided on at least one circumferential surface of an outer circumferential surface of the piston portion and an inner circumferential surface of the cylinder portion, and the piston portion and the cylinder portion are constructed so that a distance between the outer circumferential surface of the piston portion and the inner-circumferential surface of the cylinder portion in a portion where the concave portion is provided is greater than the distance between the circumferential surfaces in a portion where the concave portion is not provided; and the surface area of the portion between the circumferential surfaces where the distance between the circumferential surfaces is large changes as the piston portion and the cylinder portion displace in the axial direction, wherien the first installation portion is supported by one of the portion that rotates together with the adjustment lever centered around the adjustment rod, and the portion that is fixed to the other support-plate portion, and the second installation portion is supported by the other of the portion that rotates together with the adjustment lever centered around the adjustment rod, and the portion that is fixed to the other support-plate portion, with the first installation portion and the second installation portion being supported to be pivotally displaced respectively centered around a pivot shaft that is arranged in the width direction, and to absorb dimensional change in the axial dimension of the expansion mechanism.

5. The steering wheel position adjusting apparatus according to claim 2, wherein the portion that rotates together with the adjustment lever centered around the adjustment rod is a protrusion formed on a portion of an outer peripheral surface of a boss portion provided at a base-end portion of the adjustment lever, the portion being separated in a circumferential direction from the adjustment lever, and the portion that is fixed to the other support plate portion is an extending portion formed by extending a half portion of the other support-plate portion backward, wherein, in a state in which the adjustment lever is rotated to a position that enables position adjustment of the steering wheel, and the steering wheel is at a top-end position of an adjustable range of the steering wheel, a position where a center position of a connecting portion between the portion that rotates together with the adjustment lever centered around the adjustment rod and one end portion of the expandable damper is taken to be a center position of a top-end side, and in a state in which the adjustment lever is rotated to the position that enables position adjustment of the steering wheel, and the steering wheel is at a bottom-end position of the adjustable range, a position where the center position of the connecting portion is taken to be a center position of a bottom-end side, a center position of a connecting portion between other end portion of the expandable damper and the portion fastened to the other support-plate portion is located on a perpendicular bisector of a line that connects the center position of the top-end side and the center position of the bottom-end side, or, is located on a straight line that passes through a center point of the line and is inclined with respect to the perpendicular bisector of the line by an angle having an absolute value of 10 degrees or less.

6. The steering wheel position adjusting apparatus according to claim 1, wherein a facing surface area between the inner circumferential surface of the cylinder portion and the outer circumferential surface of the damper rod is ensured by forming the surfaces so as to be continuous uneven surfaces having alternating concave portions and convex portions in a circumferential direction of the cylinder portion.

7. The steering wheel position adjusting apparatus according to claim 2, wherein the portion that rotates together with the adjustment lever centered around the adjustment rod is a protrusion integrally provided on an outer circumferential surface of the drive-side cam, and the portion that is fixed to the other support plate portion is a support-arm portion integrally provided with the driven-side cam corresponding to the pressing portion provided on the portion that protrudes from the outside surface of the other support-plate portion, the driven-side cam surface being formed on the driven-side cam.

8. The steering wheel position adjusting apparatus according to claim 1, further comprising:

grease that is located between the inner circumferential surface of the cylinder portion and the damper rod, wherein a dynamic viscosity of a base oil of the grease is 500 to 50,000 $mm^2/s$ at 40° C.

9. The steering wheel position adjusting apparatus according to claim 1, wherein a coefficient of linear expansion of a radially inward material that constitutes the damper rod is greater than a coefficient of linear expansion of a radially outward material that constitutes the cylinder portion.

* * * * *